(12) United States Patent
Yamazaki

(10) Patent No.: US 7,081,999 B2
(45) Date of Patent: Jul. 25, 2006

(54) IMAGE DISPLAY APPARATUS AND HEAD MOUNTED DISPLAY USING IT

(75) Inventor: Shoichi Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 266 days.

(21) Appl. No.: 09/915,455

(22) Filed: Jul. 27, 2001

(65) Prior Publication Data

US 2002/0060851 A1 May 23, 2002

(30) Foreign Application Priority Data

| Sep. 27, 2000 | (JP) | ......................................... | 2000-294770 |
| Sep. 27, 2000 | (JP) | ......................................... | 2000-294771 |
| Feb. 19, 2001 | (JP) | ......................................... | 2001-041799 |

(51) Int. Cl.
*G02B 27/14* (2006.01)

(52) U.S. Cl. .................... 359/630; 359/631; 359/633

(58) Field of Classification Search ................ 359/630, 359/631, 632, 633, 634, 636, 637, 638, 640, 359/815; 345/8, 7, 9
See application file for complete search history.

(56) References Cited

U.S. PATENT DOCUMENTS

| 6,222,676 | B1 * | 4/2001 | Togino et al. ............... 359/631 |
| 6,335,838 | B1 | 1/2002 | Kasai et al. |
| 6,396,639 | B1 * | 5/2002 | Togino et al. ............... 359/630 |
| 6,447,122 | B1 | 9/2002 | Kobayashi et al. |
| 6,462,881 | B1 * | 10/2002 | Takeyama ................... 359/630 |
| 6,480,337 | B1 * | 11/2002 | Inoguchi et al. ............ 359/630 |

FOREIGN PATENT DOCUMENTS

| EP | 1043619 | 10/2000 |
| JP | 7-212680 | 8/1995 |
| JP | 07-212680 | 8/1995 |
| JP | 2000-180787 | 6/2000 |
| JP | 2000-241751 | 9/2000 |
| JP | 2000-249968 | 9/2000 |
| JP | 2002-90692 | 3/2002 |
| JP | 2002-090692 | 3/2002 |

* cited by examiner

*Primary Examiner*—Alicia M. Harrington
(74) *Attorney, Agent, or Firm*—Fitzpatrick, Cella, Harper & Scinto

(57) ABSTRACT

An image display apparatus includes a reflective display device, a light source for illuminating the display device, an illumination optical system for guiding light from the light source to the display device, and a display optical system for guiding light from the display device to an eye of an observer. The illumination optical system and the display optical system share an optical surface A having a curvature on a local meridional section. There is a curved surface B provided on the opposite side of the optical surface A to the display device. The optical surface A and optical surface B compose a lens body. Rays emitted from the light source are reflected by the optical surface A of the lens body to illuminate the display device, and reflected light from the display device is transmitted by the optical surface A to enter the lens body. The light then emerges from the optical surface B, and thereafter is guided to the pupil, thus permitting observation of an enlarged image of the image displayed on the display device.

20 Claims, 9 Drawing Sheets

IMAGE DISPLAY APPARATUS AND HEAD MOUNTED DISPLAY USING IT

BACKGROUND OF THE INVENTION

1. Field of the Invention

The present invention relates to image display apparatus and, for example, is suitably applicable to head mounted displays (HMDs), goggle type displays, and so on using a reflection type liquid crystal display element as a display element for displaying image information for observation and permitting an observer to observe an enlarged image of the image information displayed on the display element, through an optical element appropriately set.

2. Related Background Art

A variety of proposals have been made heretofore on head-worn image observation apparatus (image display apparatus), so called head mounted displays (HMDs), for presenting an enlarged virtual image of image information displayed on an image display element such as a liquid crystal display or the like.

Among these, the HMDs using the reflective display element were proposed, for example, in Japanese Patent Application Laid-Open Nos. 7-128614, 11-125791, 11-337863, 2000-10041, and so on.

The HMDs proposed in these applications are those constructed in such structure that light emitted from an illumination light source is reflected on a reflective liquid crystal display and that the reflected light is guided to the eye to permit observation of an enlarged image of the image displayed on the liquid crystal display. In this structure the light travels from the illumination light source via an illumination optical system, the reflective liquid crystal display, and a display optical system to the eye in the order named. In a disclosed embodiment of the HMD proposed in the Japanese Patent Application Laid-Open No. 11-125791, the light from the illumination light source directly illuminates the reflective liquid crystal display without use of the illumination optical system. In this case there is also an example in which no shared surface exists between the illumination optical system and the display optical system. In this structure, in order to prevent the light from the illumination light source from being eclipsed, a large space is necessary between the illumination light source and the reflective liquid crystal display, so that the apparatus tends to become large in size. In most of the embodiments proposed in the other applications, there exists a shared surface or shared surfaces between the illumination optical system and the display optical system. With existence of the shared surface(s), the optical paths of the illumination optical system and the display optical system overlap with each other and this facilitates reduction of size. However, as the number of such common surfaces increases, the optical systems become more complex and loss of light amount also increases. Meanwhile, the inventor proposed a compact display optical system for HMD in Japanese Patent Application Laid-Open No. 7-333551. This application describes the reduction of size of the entire apparatus by use of a free-form surface prism. Further, the inventor also proposed the HMDs including combination of the free-form surface prism with the reflective display element in Japanese Patent Application Laid-Open Nos. 11-125791, 11-337863, and 2000-10041.

In the field of the image observation apparatus such as the HMDs and the like, an important subject has been and is to reduce the size and weight of the entire apparatus, because the apparatus is mounted on the observer's head. In addition, another important subject is to permit the observer to well observe the image information displayed on the display means.

When the reflective liquid crystal display element is used as an image display device, the illumination device for illuminating it needs to be appropriately built in the apparatus, in order to decrease the size of the entire apparatus.

For example, when the apparatus is constructed in such structure that for illuminating the reflective liquid crystal display with the light from the illumination light source, the light travels via a lot of reflective and transmissive surfaces or travels through a prism body of long optical path lengths, there inevitably occurs loss in the amount of the light from the illumination light source before arrival at the reflective liquid crystal display. Therefore, there are desires for HMDs having the display optical system and the illumination optical system both being compact and causing little loss of light amount.

An object of the present invention is to provide image observation apparatus for permitting an observer to observe image information displayed on a display means such as a liquid crystal display or the like, which realizes reduced loss of light amount while accomplishing the reduction of size of the entire apparatus and which permits the observer to observe the image information with good image quality, by properly setting configurations of the illumination optical system from the light source means to the display means and the display optical system for guiding the light from the display means to the observer's eye, and also provide head mounted displays using it.

SUMMARY OF THE INVENTION

An image display apparatus according to one aspect of the present invention is an image display apparatus comprising:
reflective display means;
illumination light source means for illuminating the display means;
an illumination optical system for guiding light from the illumination light source means to the display means; and
a display optical system for guiding light from the display means to an eye of an observer,
wherein the illumination optical system and the display optical system share only one surface of optical surface A having two functions of transmission and reflection with each other, wherein a reference ray emitted from the illumination light source means and passing a center of an image on the display means and a center of the eye is incident from the illumination light source means to the optical surface A, is reflected under a condition of an angle $\alpha(°)$ of $20<\alpha<80$ between the entering reference ray and the reflected reference ray on the optical surface A, is incident substantially normally to the display means, is reflected thereby, is transmitted through the optical surface A, is reflected by a plurality of decentered, reflective curvature surfaces, and thereafter is guided to the eye, and the display optical system is comprised of an optical member comprising the optical surface A and another optical member having an optical refracting power, said optical members being placed with an air space in between.

In a further aspect of the above image display apparatus, the optical surface A in the illumination optical system is a reflective curvature surface having a positive refracting power on a local meridional section (a plane including incident light and exit light of the reference ray).

In a further aspect of the above image display apparatus, the illumination light source means is an RGB time division light source and the display means displays images of R, G, and B in time division in synchronism with emission of color light beams of R, G, and B from the RGB time division light source.

In a further aspect of the above image display apparatus, an angle $\beta(°)$ of incidence to the reflective display means, of the reference ray emitted from the illumination light source means satisfies the following condition:

$$-10<\beta<10.$$

In a further aspect of the above image display apparatus, the display optical system includes two or more surfaces with refracting powers differing depending upon azimuth angles, and the entire display optical system has a positive refracting power.

In a further aspect of the above image display apparatus, in an outermost image on a local meridional section of the display means (a plane including incident light and exit light of the reference ray), an F3 eye center ray represents a ray passing the center of the eye and an outermost image on the far side from the eye, local_$fy$(F3) is a total focal length in the local meridional section of the display optical system on the F3 eye center ray, local_$fyC$(F3) is a focal length in the local meridional section on a hit point of the F3 eye center ray on a transmissive surface C with a refracting power closest to the eye, and a ratio of the focal lengths satisfies the following condition:

$$-0.6<\text{local}\_fy(F3)/\text{local}\_fyC(F3)<-0.1.$$

An image display apparatus according to another aspect of the present invention is an image display apparatus comprising:

reflective display means;

illumination light source means for illuminating the display means;

an illumination optical system for guiding light from the illumination light source means to the display means; and a display optical system for guiding light from the display means to an eye of an observer, wherein an optical surface A having two functions of transmission and reflection, shared between the illumination optical system and the display optical system, has a curvature on a local meridional section (a plane including incident light and exit light of a reference ray emitted from the illumination light source means and passing a center of an image on the display means and a center of the eye), wherein when local_$fy$ represents a focal length in the local meridional section of the display optical system and local_$fyA$ a focal length in the local meridional section of only the optical surface A in the illumination optical system, a ratio of the focal lengths satisfies the following condition:

$$0.1<\text{local}\_fyA/\text{local}\_fy<1.0,$$

wherein rays emitted from the illumination light source means are reflected by the optical surface A to illuminate the display means and the reflected light from the display means is transmitted through the optical surface A, is reflected by a plurality of reflective surfaces, and thereafter is guided to the eye.

In a further aspect of the above image display apparatus, the optical surface A having the two functions of transmission and reflection, shared between the illumination optical system and the display optical system, comprises only one surface.

In a further aspect of the above image display apparatus, the plurality of reflective surfaces in the display optical system are decentered curvature surfaces.

In a further aspect of the above image display apparatus, the display optical system is comprised of an optical member comprising the optical surface A and another optical member having an optical refracting power, said optical members being placed with an air space in between.

In a further aspect of the above image display apparatus, the illumination light source means is an RGB time division light source and the display means displays images of R, G, and B in time division in synchronism with emission of color light beams of R, G, and B from the RGB time division light source.

In a further aspect of the above image display apparatus, the display optical system includes two or more surfaces with refracting powers differing depending upon azimuth angles, and the entire display optical system has a positive refracting power.

An image display apparatus according to still another aspect of the present invention is an image display apparatus comprising:

reflective display means;

illumination means for illuminating the display means;

an illumination optical system for guiding light from the illumination means to the display means; and a display optical system for guiding light from the display means toward an observer, wherein the illumination optical system and the display optical system share an optical surface A having two functions of transmission and reflection with each other, the optical surface A has a curvature on a local meridional section (a plane including incident light and exit light of a reference ray emitted from the illumination means and passing a center of an image on the display means and a center of the pupil), a curved surface B is provided on the opposite side of the optical surface A to the display means, and the optical surface A and optical surface B compose a lens body, wherein rays emitted from the illumination means are reflected by the optical surface A of the lens body to illuminate the display means, and the reflected light from the display means is transmitted by the optical surface A to enter the lens body and then emerge from the optical surface B, is then reflected by a plurality of reflective surfaces, and thereafter is guided to the pupil to form an enlarged image of the image displayed on the display means, and wherein when local_$ryA$ represents a radius of curvature in the local meridional section, of the optical surface A of the lens body in the display optical system and local_$ryB$ a radius of curvature in the local meridional section, of the curved surface B, local_$ryA$ and local_$ryB$ have an identical sign and satisfy the following condition:

$$0.4<\text{local}\_ryA/\text{local}\_ryB<2.0.$$

In a further aspect of the above image display apparatus, the optical surface A having the two functions of transmission and reflection, shared between the illumination optical system and the display optical system, comprises only one surface.

In a further aspect of the above image display apparatus, the reflected light from the display means emerge from the lens body and thereafter is reflected by a plurality of reflective surfaces being decentered curvature surfaces to be guided to the pupil.

In a further aspect of the above image display apparatus, said illumination means is a time division light source for emitting a plurality of color light beams in time division and the display means displays images based on respective color beams in time division in synchronism with emission of the color light beams from the time division light source.

In a further aspect of the above image display apparatus, the display optical system includes two or more surfaces with refracting powers differing depending upon azimuth angles, and the entire display optical system has a positive refracting power.

In a further aspect of the above image display apparatus, said lens body is comprised of a glass member.

In a further aspect of the above image display apparatus, said optical surface A and said curved surface B are cylindrical surfaces.

In a further aspect of the above image display apparatus, said optical surface A is a half mirror of metal.

An image display apparatus according to still another aspect of the present invention is an image display apparatus comprising:

reflective display means;

illumination means for illuminating the display means;

an illumination optical system for guiding light from the illumination means to the display means; and a display optical system for guiding light from the display means toward an observer, wherein the illumination optical system and the display optical system share an optical curvature surface A having two functions of transmission and reflection with each other, a curved surface B is provided on the opposite side of the optical curvature surface A to the display means, and the optical curvature surface A and the curved surface B compose a lens body, wherein rays emitted from the illumination means are reflected by the optical curvature surface A of the lens body to illuminate the display means, and the reflected light from the display means is transmitted by the optical curvature surface A, is incident to the lens body, emerges from the curved surface B, is reflected by a plurality of reflective surfaces, and thereafter is guided to the pupil to form an enlarged image of the image displayed on the display means, wherein in an outermost image on a local meridional section of the display means (a plane including incident light and exit light of a reference ray emitted from the illumination means and passing a center of an image on the display means and a center of an eye), when an F3 eye center ray represents a ray passing the center of the eye and an outermost image height F3 on the far side from the eye and when an F2 eye center ray represents a ray passing the center of the eye and an outermost image height F2 on the near side to the eye, an optical path length of the F3 eye center ray in the lens body in the display optical system is longer than that of the F2 eye center ray.

In a further aspect of the above image display apparatus, a curvature in the local meridional section of said optical curvature surface A of said lens body in said display optical system is larger than a curvature in the local meridional section of said curved surface B.

In a further aspect of the above image display apparatus, optical path lengths in the lens body in the display optical system of eye center rays at respective image heights, passing the image heights and the center of the eye, on the local meridional section of said display means, become gradually longer from said F2 eye center ray side to said F3 eye center ray side.

A head-mounted display according to the present invention comprises the image display apparatus according to either of the above various aspects.

DETAILED DESCRIPTION OF THE PREFERRED EMBODIMENTS

Figure 1:
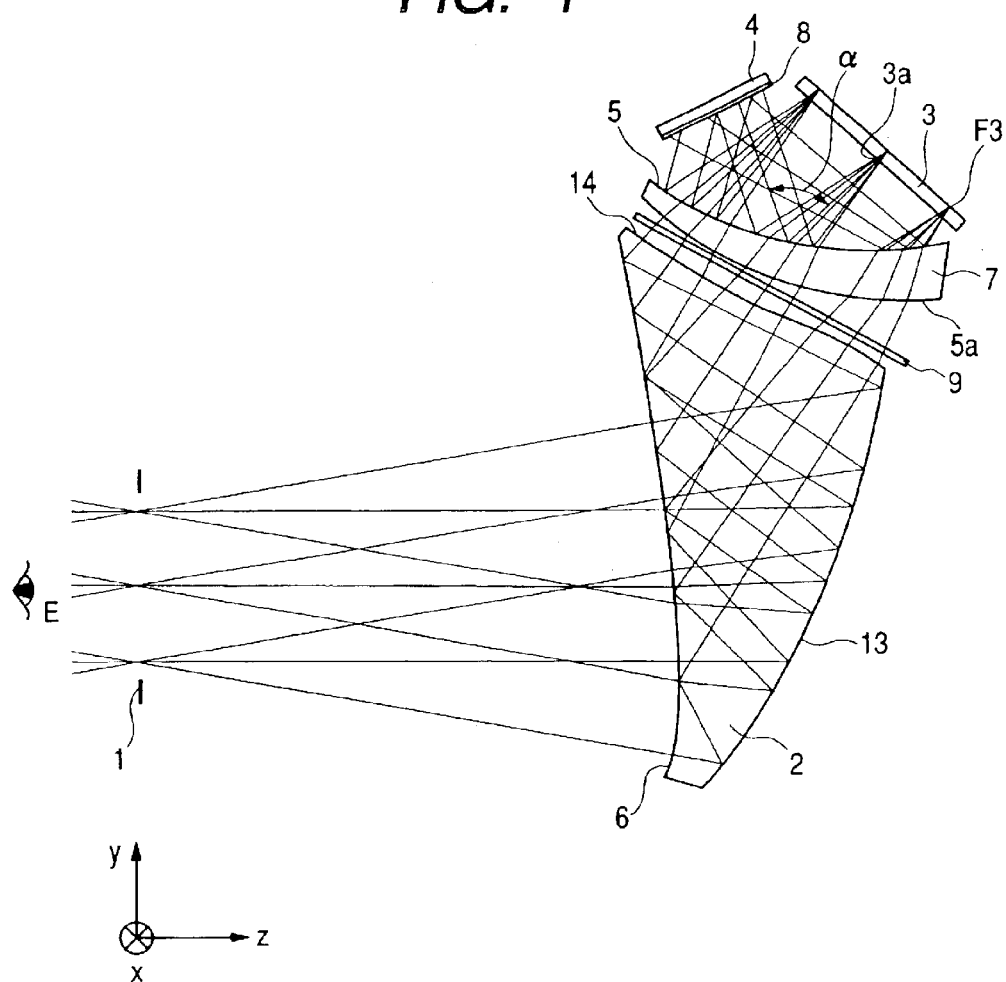
FIG. 1 is a cross-sectional view of the major part of Embodiment 1 of the present invention.

FIG. 1 to FIG. 8 are cross-sectional views of the major part of Embodiments 1 to 8 of the present invention. In the figures reference numeral 1 designates the pupil position, at which the eye of the observer is located.

Reference numeral 2 denotes a free-form surface prism (second optical member), 3 a reflective liquid crystal display, 4 an illumination light source, 5 a transmissive/reflective surface (optical surface) with a curvature consisting of a half mirror, 7 a boomerang type lens (first optical member) including a reflective surface 5 and a curved surface 5a, 8 and 9 polarizers, an illumination prism (first optical member), 11 an illumination system correcting prism, and 12 an illumination system cemented prism (first optical member) comprised of an illumination prism 10 and the illumination system correcting prism 11 cemented to each other.

Numeral 17 represents a first free-form surface mirror (second optical member) and 18 a second free-form surface mirror (second optical member).

The elements indicated by numerals 4, 5 or by numerals 4, 5, 10 constitute one element of the illumination optical system and the elements indicated by numerals 3, 5, 7, 2 or by numerals 3, 10, 5, 11, 2, 17, 18 or by numerals 3, 10, 5, 2 or by numerals 3, 5, 7, 18, 17 constitute one element of the display optical system.

Figure 8:
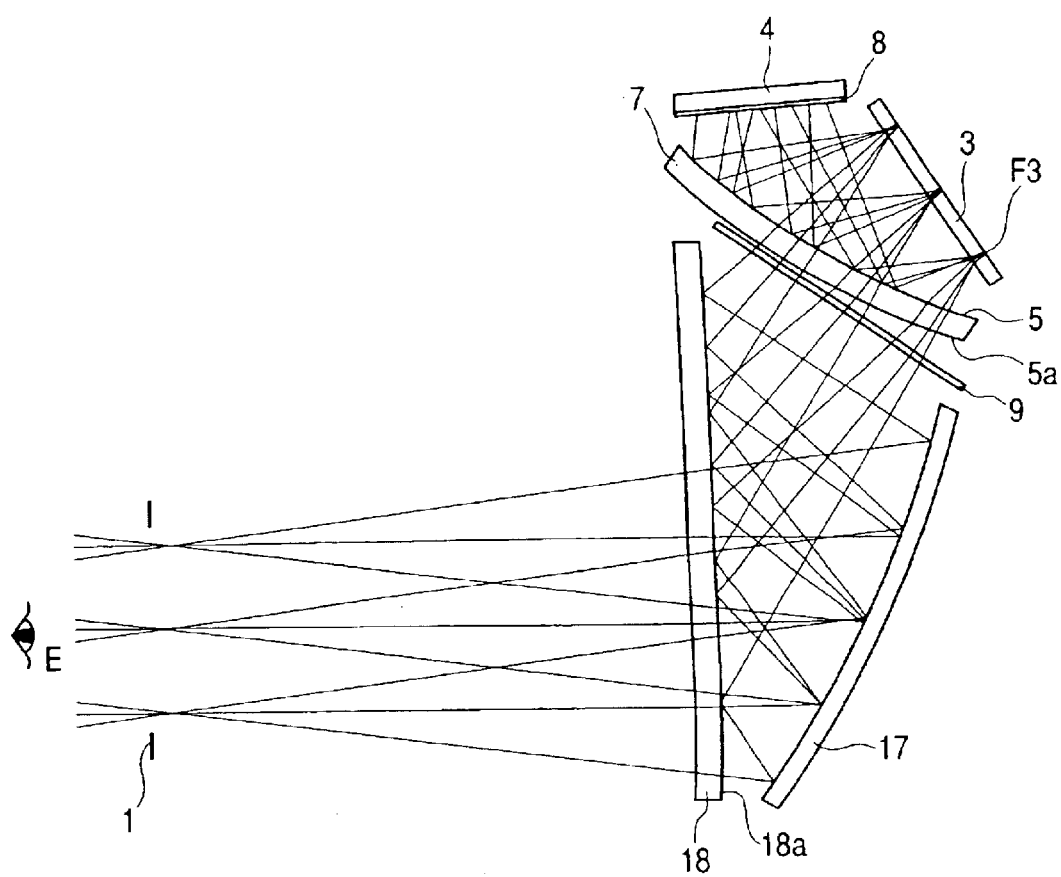
FIG. 8 is a cross-sectional view of the major part of Embodiment 8 of the present invention.

In the present embodiment, in order to decrease the loss in the amount of the light from the illumination light source 4, the illumination light source 4 is set as close to the reflective liquid crystal display 3 as possible, thereby decreasing the optical path lengths of the illumination optical system. When the free-form surface prism 2 is used in the display optical system, a member or members making the illumination optical system are placed between the free-form surface prism 2 and the reflective liquid crystal display 3. When the two free-form surface mirrors 17, 18 are used in the display optical system as illustrated in FIG. 8, a member making the illumination optical system is disposed between the free-form surface mirror system (17, 18) and the reflective liquid crystal display 3.

Before describing each of the embodiments of the present invention, definitions will be described for a meridional section, a sagittal section, a local meridional section, and a local sagittal section used in the present invention. In the definition of the conventional systems not adapted for decentered systems, when the z-axis is taken along the optical axis in a coordinate system at a vertex of each surface, a yz section agrees with the general meridional section and an xz section with the general sagittal section. Since the present invention involves the decentered systems, new definitions will be given to the local meridional section and the local sagittal section adaptable for the decentered systems. The local meridional section is defined as a plane including incident light and emergent light of a reference ray on a hit point (incident point) between each surface and a ray passing the center of the image on the display means (or the center of the outside image in the seethrough case for observation of the outside) and the center of the eye (such a ray will be referred to as a reference ray), and the local sagittal section as a plane including the hit point and being perpendicular to the local meridional section and parallel to the meridional section of the coordinate system at the vertex of each surface (i.e., the ordinary sagittal section). When the display means is of the reflection type, the reference ray is extended up to the illumination optical system and to the illumination light source and the local meridional section and local sagittal section are defined on each hit point in the same manner as above. The focal length in the local meridional section and the focal length in the local sagittal section will be described in the section of the embodiments described later. The features of the present invention will be described below.

The embodiments of the present invention will be described below. FIG. 1 to FIG. 8 are cross-sectional views of optical paths (local meridional sections) in Embodiments 1 to 8 of the present invention. Embodiments 1 to 5 are examples of a type in which the reflective LCD (reflective liquid crystal display) 3 is illuminated with almost normally incident light, while Embodiments 6 to 8 of the present invention are examples of a type in which the reflective LCD 3 is illuminated with obliquely incident light. It is known as characteristics of general liquid crystals (TN liquid crystals and others) that light almost normally emerging from the liquid crystal display has adequate contrast and provides good image quality but the contrast and image quality becomes deteriorated as the emerging light increases its inclination away from the normal. In order to solve it, the apparatus of the former type (Embodiments 1 to 5) is arranged to illuminate the reflective LCD 3 with the normally incident light. The ferroelectric liquid crystals (FLCs) and the like have different characteristics that the contrast is maintained even with the obliquely emerging light at considerably large angles, and thus the image can be observed with good quality from almost all angles. Thus the apparatus of the latter type (Embodiments 6 to 8) is provided on the assumption of use of such liquid crystals (FLCS) and arranged to reduce the thickness of the entire optical system by illuminating the reflective LCD 3 with the obliquely incident light and attain good image quality without degradation of contrast. It is a matter of course that the ferroelectric liquid crystals (FLCs) can be adopted in Embodiments 1 to 5.

Figure 2:
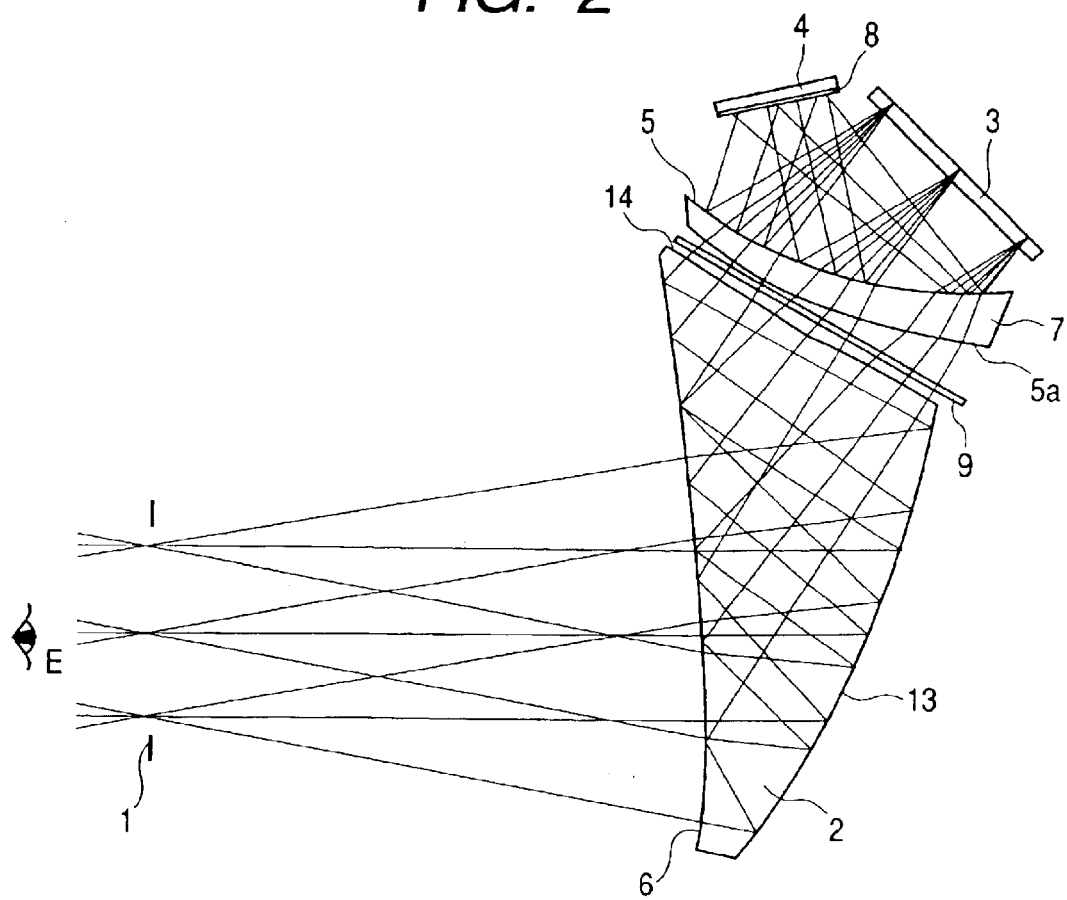
FIG. 2 is a cross-sectional view of the major part of Embodiment 2 of the present invention.

In FIG. 1 and FIG. 2 (Embodiments 1, 2) the boomerang type lens 7 is placed between the reflective LCD 3 (the back surface side of which is a liquid crystal plane) and the free-form surface prism 2 including arbitrary curved surfaces (the lens 7 of the shape of FIG. 1 and FIG. 2 on the local meridional section will be called the boomerang lens). The light emitted from the flat illumination light source 4 having a plurality of LEDs for each of R, G, and B (red light, green light, and blue light) is converted into linearly polarized light by the polarizer 8, the linearly polarized light is reflected by the liquid-crystal-3-side optical surface 5 (half mirror) of the boomerang lens 7, and the reflected light is then incident to the reflective LCD 3 so that the principal rays thereof are incident at angles approximately normal (0°±10°) thereto. The light reflected by the reflective LCD 3 is then transmitted this time by the optical surface 5 and then emerges from the boomerang lens 7 to enter the polarizer 9. At this time, since the polarization direction of the light linearly polarized in the polarizer 8 is rotated inside the liquid crystal (by OFF or ON of liquid crystal driving voltage), the polarizer 9 needs to be set so that its transmission direction is aligned with the polarization direction of the thus rotated light. In the configuration wherein the linear polarization direction of the polarizer 9 deviates about 90° from the linear polarization direction of the polarizer 8 (the rotation of the polarization direction inside the liquid crystal is 90°), the light linearly polarized in the polarizer 8 also produces light (ghost light) transmitted without being reflected by the optical surface 5 (half mirror), and the polarizer 9 cuts this ghost light, thus yielding an added value of preventing the ghost light from entering the eye E. When the reflective LCD 3 is of a type of display with a single polarizer, not illustrated, in the vicinity of the display surface, the polarizer 8 and polarizer 9 do not have to be used. After emerging from the polarizer 9, the light is then incident to an entrance surface 14 of the free-form surface prism 2, successively is totally reflected by a total reflection surface (transmissive surface C) 6, is reflected by a concave mirror 13, is transmitted this time by the total reflection surface (transmissive surface C) 6, and then is guided to the pupil 1 where the observer's eye is located. This permits the observer to observe an enlarged virtual image of the image information based on the reflective LCD 3. In Embodiments 1, 2, the boomerang lens 7, in which the two surfaces both are curvature surfaces directed in the opposite direction to the reflective LCD 3 on the local meridional section, is placed opposite to the reflective LCD 3, and the reflective-LCD-3-side surface of the boomerang lens 7 is comprised of the optical surface (half mirror) 5 whereby the spacing between the free-form surface prism 2 and the reflective LCD 3 on the lower outermost image (F3) side is set to as short a distance as possible on the local meridional section of the reflective LCD 3, thus constructing the display system (members 3, 7, 2) in compact structure and the illumination system (members 4, 5) in compact structure as well. In Embodiment 1 of FIG. 1 the both surfaces 5, 5*a* of the boomerang lens 7 are cylindrical surfaces (free-form surfaces) having a power only in the meridional section, so as to minimize occurrence of aberration on the local sagittal section (the section normal to the plane of the drawing) and the surfaces have no power in the direction of the sagittal section or the local sagittal section and thus have no curvature in the surface shape in this sectional direction, so as to be able to place the reflective LCD 3 and the optical surface 5 close to each other, thus enabling compactification of the apparatus. The other surface 5*a* is also of a surface shape close to the optical surface 5, so as to cancel occurrence of aberration in the boomerang lens 7. It is noted here that the cylindrical surface is one of the free-form surfaces, because its refracting powers differ depending upon azimuth angles, and that in the present invention a surface having no power in either the sagittal section or the meridional section will be called cylindrical surface hereinafter. It is a matter of course that an equivalent effect and better optical performance are attained if the both surfaces of the boomerang lens 7 are free-form surfaces having a weak power in the direction of the local sagittal section but a strong power in the direction of the local meridional section.

In Embodiment 2 of FIG. 2 the both surfaces 5, 5a of the boomerang lens 7 are rotationally symmetric, aspherical surfaces. In this configuration the optical surface 5 is also provided with a positive power on the local sagittal section whereby the size of the light source 4 for flat illumination is decreased in the direction of the local sagittal section. The other surface 5a is also of a surface shape close to the optical surface 5, thereby canceling occurrence of aberration in the boomerang lens 7. The lens can also be comprised of two surfaces of rotationally symmetric, spherical surfaces, but the lens comprised of the both surfaces of rotationally symmetric, aspherical surfaces demonstrates better optical performance.

The free-form surface prism 2 (common to Embodiments 1 to 7) included in the display system of the present invention is constructed by employing a free-form surface for the concave mirror 13 having the main power (positive refracting power) of the free-form surface prism, thereby decreasing occurrence of decentering aberration on the main power surface. The decentering aberration left after the correction by the main power surface is corrected for in such a manner that the total reflection surface (transmissive surface C) 6 near the main power surface is formed as a free-form surface in such a surface shape as to cancel the aberration. This configuration alone enables the correction of aberration to some extent, but, in order to make a balance among whole aberrations, the entrance surface 14 near the display means (reflective LCD) 3 is also formed as a free-form surface to make a good balance among whole aberrations. Since the total reflection surface (transmissive surface C) 6 is set under the total reflection condition (critical angle condition) to totally reflect the light incident at angles over the critical angle but transmit the light incident at angles below the critical angle, the bright display optical system can be constructed theoretically with no loss of light amount at all.

Figure 3:
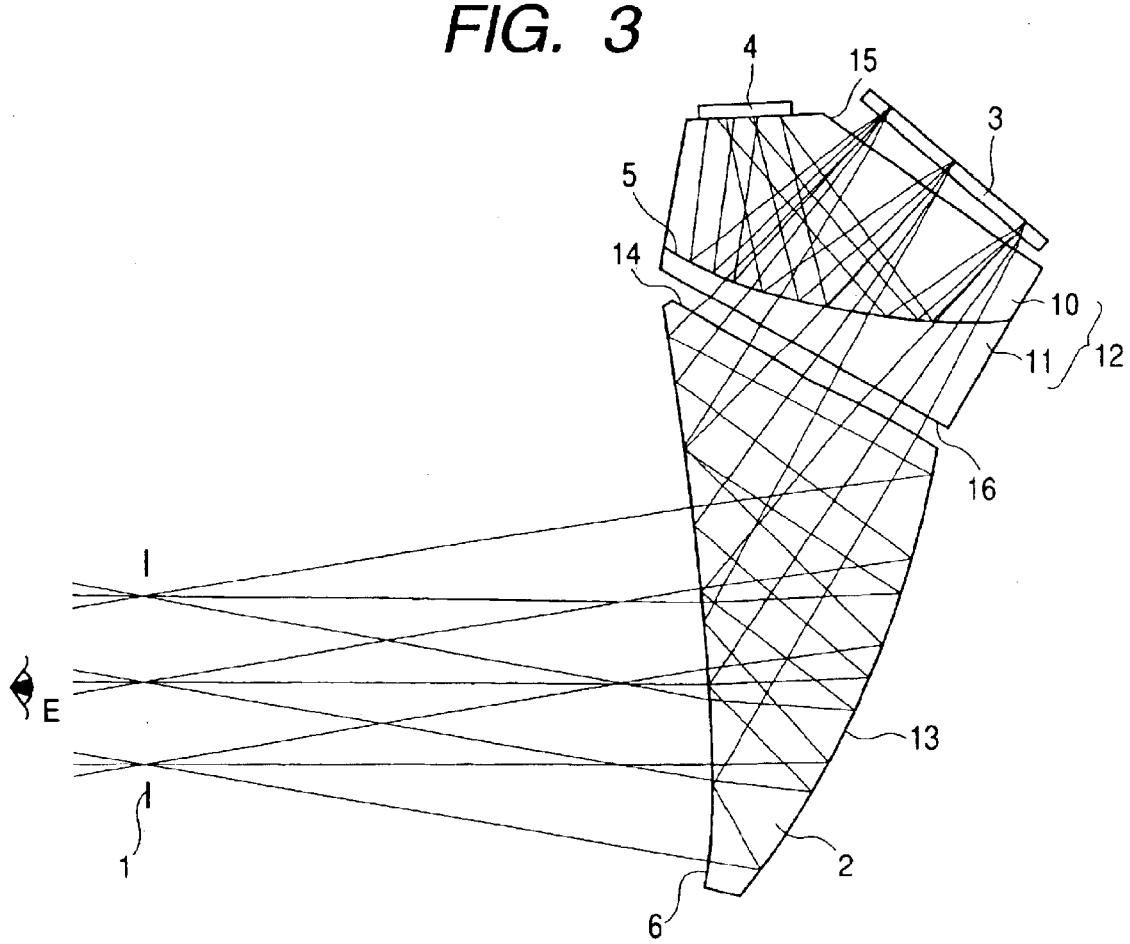
FIG. 3 is a cross-sectional view of the major part of Embodiment 3 of the present invention.
Figure 4:
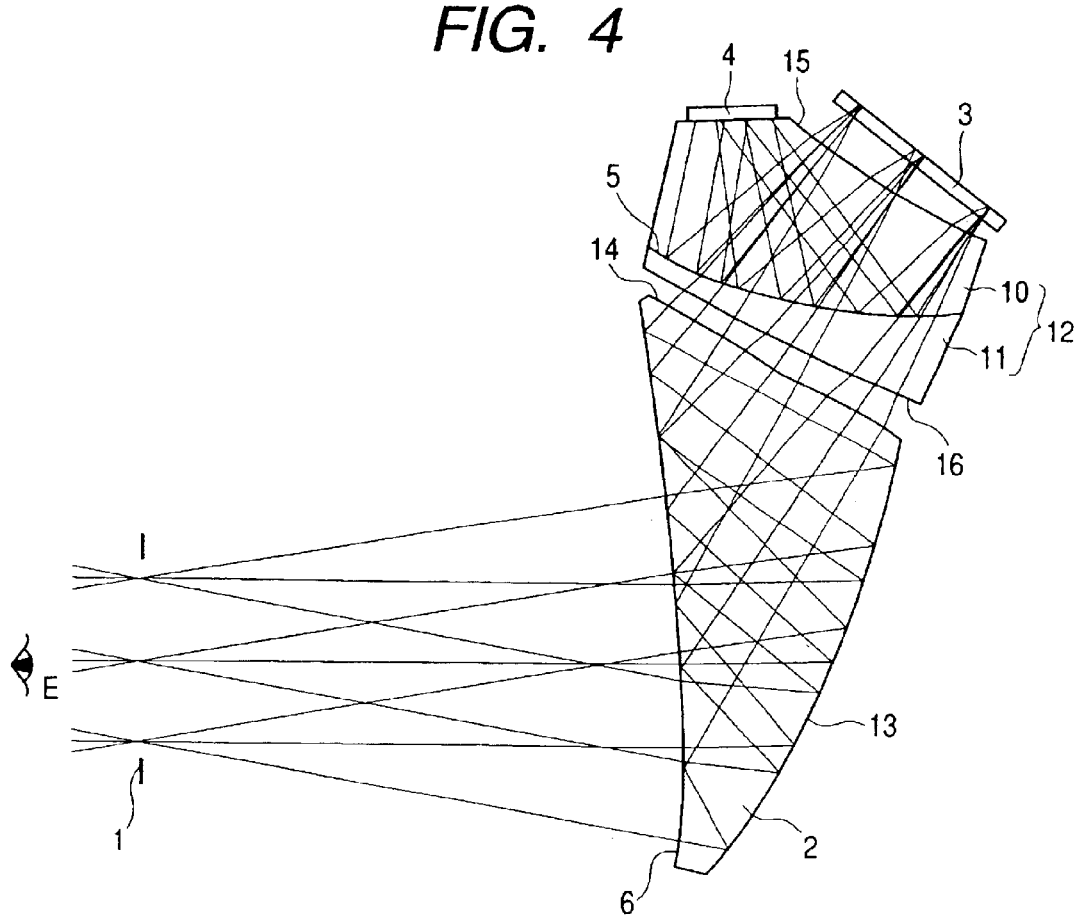
FIG. 4 is a cross-sectional view of the major part of Embodiment 4 of the present invention.

FIG. 3 and FIG. 4 are cross-sectional views of optical paths in Embodiments 3, 4 of the present invention. The illumination system prism 10 including the optical surface 5, and the illumination system correcting prism 11 are cemented to each other and placed between the reflective LCD 3 and the free-form surface prism 2. The illumination prism 10 and the illumination system correcting prism 11 compose the illumination system cemented prism 12 with little power on the local meridional and local sagittal sections in the display optical system. This configuration can achieve good optical performance of the display system, because there is little occurrence of aberration due to the illumination system cemented prism 12 in the display system (3, 10, 11, 2). The optical paths are such that the light from the flat illumination light source 4 is incident to the illumination system prism 10, the principal rays reflected by the optical surface 5 (half mirror) are incident almost normally to the reflective LCD 3 to be reflected thereby, and the light is again incident to the illumination system prism 10, is transmitted this time by the optical surface 5 (half mirror), is transmitted by the illumination system correcting prism 11, is then incident to the entrance surface 14 of the free-form surface prism 2, is totally reflected by the surface 6, and is guided via the reflective surface 13 and the transmissive surface 6 to the eye E. These embodiment use the reflective LCD of the single polarizer type not illustrated. If two polarizers are used they are placed at the respective angles of the polarization directions described previously, immediately after the flat illumination light source 4 and immediately before the entrance surface 14 of the free-form surface prism 2, as in Embodiments 1, 2. In Embodiment 3 the surface 15 of the illumination system prism 10 and the surface 16 of the illumination system correcting prism 11 both are planes and the optical surface 5 at the junction between them is a cylindrical surface. Since the cylindrical surface has no power in the direction of the sagittal section or the local sagittal section, the thickness of the illumination system cemented prism 12 can be made small. In Embodiment 4 the surface 15 of the illumination system prism 10 and the surface 16 of the illumination system correcting prism 11 both are curved surfaces, so as to cancel the aberration produced in the free-form surface prism 2. The optical surface 5 at the junction between the two surfaces is a rotationally symmetric, aspherical surface having a positive power on the local sagittal section, whereby the size of the flat illumination light source 4 is decreased in the direction of the local sagittal section.

Figure 5:
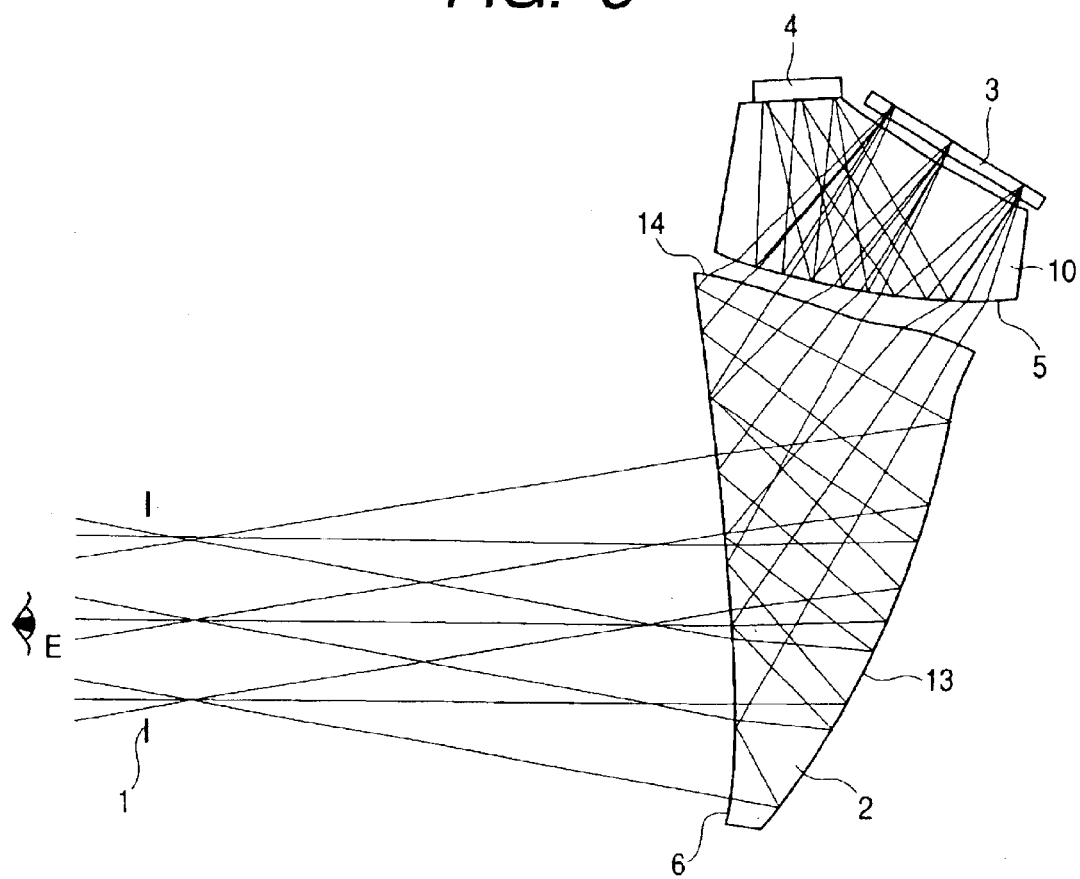
FIG. 5 is a cross-sectional view of the major part of Embodiment 5 of the present invention.

FIG. 5 is a cross-sectional view of optical paths in Embodiment 5 of the present invention.

FIG. 5 shows the structure in which only the illumination system prism 10 including the optical surface 5 is interposed between the reflective LCD 3 and the free-form surface prism 2. The optical paths are such that the light from the flat illumination light source 4 is incident to the illumination system prism 10 and is reflected by the optical surface 5 (half mirror), the principal rays are incident almost normally to the reflective LCD 3 to be reflected thereby, and the light is again incident to the illumination system prism 10, is transmitted this time by the optical surface 5 (half mirror), is then incident to the entrance surface 14 of the free-form surface prism 2, is totally reflected by the surface 6, and is guided via the reflective surface 13 and the transmissive surface 6 to the eye E. This embodiment uses the reflective LCD 3 of the single polarizer type not illustrated. If two polarizers are used they are placed at the respective angles of the polarization directions as described previously, immediately after the flat illumination light source 4 and immediately before the entrance surface 14 of the free-form surface prism 2, as in Embodiments 1, 2. Since this embodiment does not necessitate the illumination system correcting prism 11 as described in Embodiments 3, 4, the spacing can be decreased between the free-form surface prism 2 and the reflective LCD 3, thus realizing compactification of the apparatus. The optical surface 5 is a cylindrical surface with no power on the sagittal section, so as to suppress occurrence of aberration on the local sagittal section.

Figure 6:
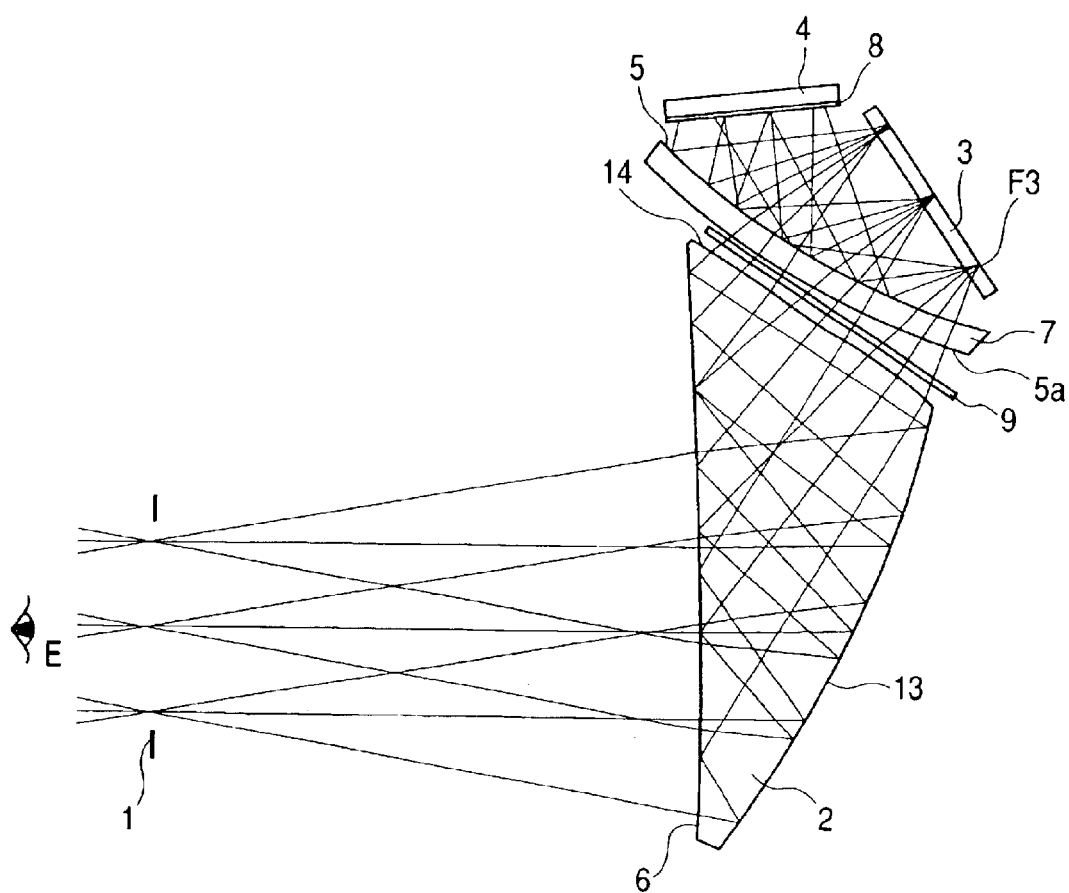
FIG. 6 is a cross-sectional view of the major part of Embodiment 6 of the present invention.
Figure 7:
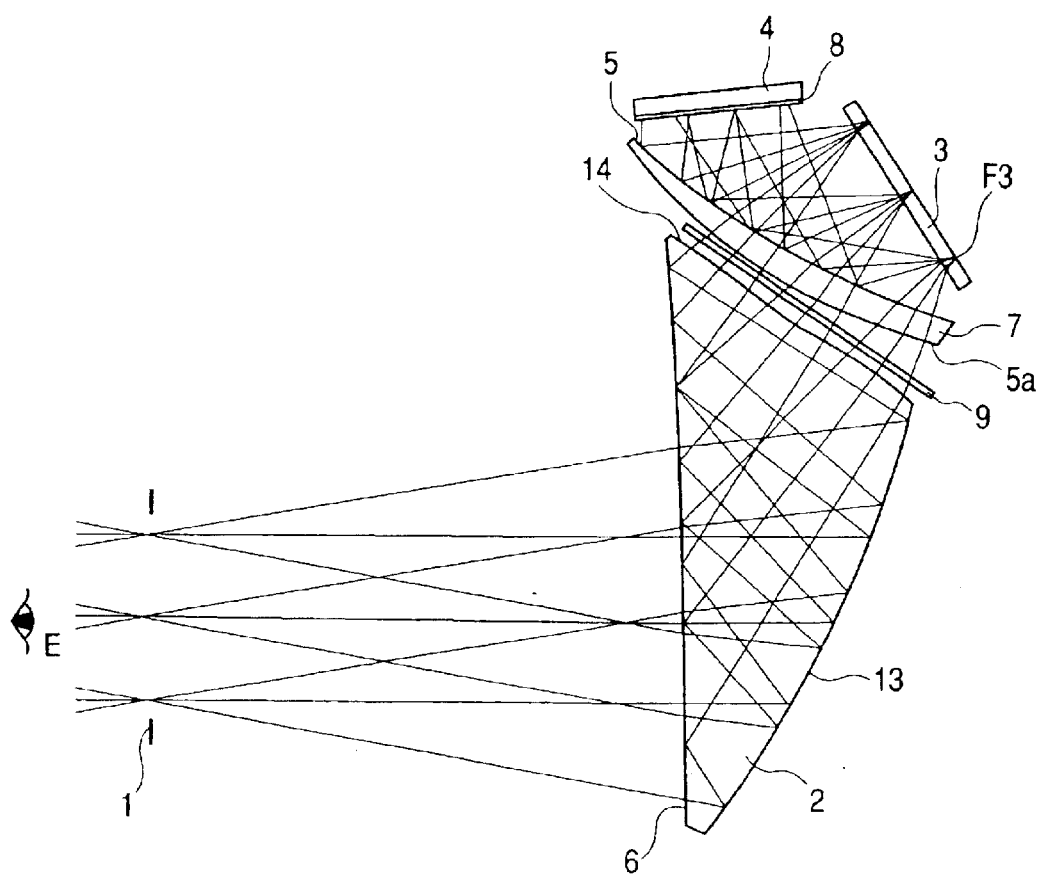
FIG. 7 is a cross-sectional view of the major part of Embodiment 7 of the present invention.

In FIG. 6 and FIG. 7 (Embodiments 6, 7) the boomerang lens 7 is placed between the reflective LCD 3 and the free-form surface prism 2. These embodiments are different in structure from Embodiments 1, 2 in that angles of incidence of the illumination rays are not perpendicular to the reflective LCD 3 and thus the illumination is of oblique incidence.

The light emitted from the light source 4 for flat illumination consisting of a plurality of LEDs for each of R, G, and B, is converted into linearly polarized light in the polarizer 8, and the linearly polarized light is reflected by the optical surface 5 (half mirror) on the liquid crystal display side of the boomerang lens 7 to be obliquely incident to the reflective LCD 3. The light reflected into oblique directions by the reflective LCD 3 is transmitted this time by the optical surface 5, emerges from the boomerang lens 7, and enters the polarizer 9. Since at this time the polarization direction of the light linearly polarized in the polarizer 8 is rotated inside the liquid crystal (by OFF or ON of liquid crystal driving voltage), the polarizer 9 needs to be set so that its transmission direction is aligned with the polarization direction of the thus rotated light.

When the linear polarization direction of the polarizer 9 deviates about 90° from the linear polarization direction of the polarizer 8 (when the rotation of the polarization direction in the liquid crystal is 90°), the light linearly polarized in the polarizer 8 also produces the light (ghost light) transmitted without being reflected by the optical surface 5 (half mirror) and the polarizer 9 cuts this ghost light, thus yielding the added value of preventing the ghost light from entering the eye E.

When the reflective LCD 3 is of the type of display with a single polarizer, not illustrated, near the display surface side, the polarizer 8 and polarizer 9 do not have to be used. After emerging from the polarizer 9, the light is incident to the entrance surface 14 of the free-form surface prism 2, then is totally reflected by the total reflection surface (transmissive surface C) 6, is reflected by the concave mirror 13, is transmitted this time by the total reflection surface (transmissive surface C) 6, and is then guided to the eye 1.

In Embodiments 6, 7, the boomerang lens 7 consisting of the two surfaces of curvature surfaces directed in the opposite direction to the reflective LCD 3 on the local meridional section is placed opposite to the reflective LCD 3 and the reflective-LCD-side surface of the boomerang lens 7 is the optical surface 5 (half mirror), whereby the spacing between the free-form surface prism 2 and the reflective LCD 3 on the lower outermost image (F3) side is made as short as possible on the local meridional section of the reflective LCD 3, thereby constructing the display system (3, 7, 2) in compact structure and the illumination system (4, 5) in compact structure as well.

Since the illumination with obliquely incident light permits a tilt decentering amount (in the clockwise rotation direction) to be set large on the local meridional section of the reflective LCD 3, the reflective LCD 3 can be constructed with a small projection amount, thus permitting decrease in the thickness of the entire optical system. In Embodiments 6, 7 the both surfaces 5, 5a of the boomerang lens 7 are cylindrical surfaces having a power only in the meridional section, so as to minimize occurrence of aberration on the local sagittal section, and they have no power in the direction of the sagittal section or the local sagittal section and have the surface shape without curvature in this sectional direction, so as to permit the reflective LCD 3 and the optical surface 5 to be placed close to each other, thus facilitating both compactification and increase of angle of view.

The other surface 5a is also of a surface shape close to the optical surface 5, thereby canceling occurrence of aberration in the boomerang lens 7. It is a matter of course that an equivalent effect and better optical performance can be attained by use of a free-form surface having a weak power in the direction of the local sagittal section and a strong power in the direction of the local meridional section. In Embodiment 7, the optical surface 5 (cylindrical surface) of the boomerang lens 7 has a gentler curvature on the local meridional section than that in Embodiment 6, whereby the reflective LCD 3 is adequately prevented from interfering with the flat illumination light source 4.

FIG. 8 (Embodiment 8) shows the structure using the two free-form surface mirrors 17, 18. In the present embodiment the boomerang lens 7 is placed in the optical paths between the reflective LCD 3 and the free-form surface mirror 18.

Just as in Embodiment 6, the angles of incidence of the illumination rays to the reflective LCD 3 are of oblique incidence. The light emitted from the light source 4 for flat illumination consisting of a plurality of LEDs for each of R, G, and B is converted into linearly polarized light in the polarizer 8, is then reflected by the optical surface 5 (half mirror) on the liquid crystal display side of the boomerang lens 7, is obliquely incident to the reflective LCD 3, and is reflected into oblique directions by the reflective LCD 3, and the reflected light is then transmitted this time by the optical surface 5, emerges from the boomerang lens 7, and then enters the polarizer 9.

Since at this time the polarization direction of the light linearly polarized in the polarizer 8 rotates inside the liquid crystal by OFF or ON of liquid crystal driving voltage), the polarizer 9 needs to be set so that the transmission direction thereof is aligned with the polarization direction of the thus rotated light. When the linear polarization direction of the polarizer 9 deviates about 90° from the linear polarization direction of the polarizer 8 (when the rotation of the polarization direction inside the liquid crystal is 90°), the light linearly polarized in the polarizer 8 also produces the light (ghost light) transmitted without being reflected by the optical surface 5 (half mirror) and the polarizer 9 cuts this ghost light, thus presenting the added value of preventing the ghost light from entering the pupil of the eye. When the reflective LCD 3 is of the type of display with a single polarizer, not illustrated, near the display surface side, the polarizer 8 and polarizer 9 become unnecessary.

After emerging from the polarizer 9, the light is incident to the free-form surface mirror 8 having a half mirror surface 18a to be reflected thereby, and the reflected light is again reflected by another free-form surface mirror 17, is then transmitted by the free-form surface mirror 18 having the half mirror surface 18a, and is guided to the eye 1. In Embodiment 8, the boomerang lens 7 with the both surfaces of curvature surfaces directed in the opposite direction to the reflective LCD 3 on the local meridional section is placed opposite to the reflective LCD 3 and the reflective-LCD-3-side surface of the boomerang lens 7 is the optical surface 5 (half mirror) whereby the spacing between the free-form surface mirrors 17, 18 and the reflective LCD 3 on the lower outermost image (F3) side is set as short as possible on the local meridional section of the reflective LCD 3, thereby constructing the display system (3, 7, 17, 18) in compact structure and the illumination system (4, 5) in compact structure as well. Since the illumination with the obliquely incident light permits the tilt decentering amount (in the clockwise rotation direction) to be set large on the local meridional section of the reflective LCD 3, the reflective LCD 3 can be constructed with a small projection amount, thus realizing the decrease of thickness of the entire optical system.

In Embodiments 8 the both surfaces (5, 5a) of the boomerang lens 7 are cylindrical surfaces having a power only in the meridional section, so as to minimize occurrence of aberration on the local sagittal section, and they have no power in the direction of the sagittal section or the local sagittal section and have the surface shape without curvature in this sectional direction, whereby the reflective LCD 3 and the optical surface 5 can be set close to each other, thus enabling compactification of the apparatus. The other surface 5a is also of a surface shape close to the optical surface 5, thereby canceling occurrence of aberration in the boomerang lens 7. It is a matter of course that an equivalent effect and better optical performance can be attained by use of a free-form surface having a weak power in the direction of the local sagittal section but a strong power in the direction of the local meridional section.

In an image display apparatus according to one aspect of the present invention, the illumination optical system and the display optical system share only one optical surface A having the both functions of transmission and reflection with each other, a reference ray is defined as a ray emitted from the illumination means and passing the center of the image of the display means and the center of the pupil, and an angle a is defined as an angle between an entering reference ray upon incidence of the reference ray to the optical surface A from the illumination means and a reflected reference ray upon reflection thereof. Then the angle a (degrees) satisfies the following condition:

$$20° < \alpha < 80° \quad (1).$$

In one aspect of the present invention, the illumination optical system and the display optical system share only one surface of the optical surface A (half mirror) having the both functions of transmission and reflection, so as to reduce the loss of light amount from the illumination light source to the reflective liquid crystal display, and Condition (1) is met, so as to enhance the contrast of image quality and achieve the compact illumination optical system. Below the lower limit of Condition (1), because the emerging light from the liquid crystal display is almost perpendicular, the liquid crystal display interferes with the illumination light source, which makes construction of the optical system difficult. Above the upper limit, the illumination optical system becomes projected toward the eye side to increase the thickness. As for the display optical system, the thickness of the display optical system is decreased by a configuration in which the light from the reflective liquid crystal display is transmitted by the optical surface 5 of the half mirror and in which the rays are folded by a plurality of decentered, reflective curvature surfaces. More preferably, it is desirable to set the numerical range of Condition (1) to the following range.

$$40 < \alpha < 70 \quad (1a)$$

By meeting this condition, an adequate space can be secured for preventing the liquid crystal display from interfering with the illumination light source if $\alpha$ is above the lower limit, while the thickness of the illumination optical system can be further decreased if $\alpha$ is below the upper limit.

An air space is secured between an optical member (first optical member) including the optical surface 5 in the display optical system and another optical member (second optical member) having an optical refracting power, whereby a polarizer can be interposed in this space. In many use methods of the reflective liquid crystal displays at present, one polarizer is placed in the illumination optical system while another polarizer in the display optical system. In the display optical system, however, since the region between the reflective liquid crystal display and the polarizer in the display optical system is in the optical relation of parallel Nicols, it is not preferable to interpose a material with strong birefringence between them, because the observer observes photoelasticity of the material. Even if a material with weak birefringence is placed and if the material has long path lengths, the observer will also observe the photoelasticity of the material. In the arrangement of the polarizer for the display optical system at the aforementioned position, since the path lengths are short because of the interposition of only the optical member including the optical surface 5, it becomes possible to use glass without birefringence or even a mold material with weak birefringence. The other optical member having the optical refracting power can be made of any material, because it is not involved in the parallel Nicols.

It is desirable to place the illumination light source and the eye (pupil position) in almost imaging relation (Köhler illumination). This arrangement realizes the highest light utilization efficiency.

In the normal incidence illumination systems presented in Embodiments 1 to 5, the angle β (degrees) of incidence of the reference ray emitted from the illumination light source, into the reflective display means is preferably set in the following range:

$$-10 < \beta < 10 \quad (2).$$

Outside this range the contrast of the liquid crystal image degrades and it becomes difficult to attain good image quality. Moreover, the numerical range of Condition (2) is preferably set to the following range:

$$-5 < \beta < 5 \quad (2a).$$

This can attain good image quality one rank up with little contrast degradation.

Let an F3 eye center ray represent a ray passing the center of the eye and the outermost image on the far side from the eye, in the outermost image on the local meridional section of the display means, local_fy(F3) be a total focal length in the local meridional section of the entire display optical system on the F3 eye center ray, and local_fyC(F3) be a focal length in the local meridional section on a hit point of the F3 eye center ray in the transmissive surface C with refracting power closest to the eye. Then the apparatus is arranged to satisfy the following condition:

$$-0.6 < \text{local\_}fy(F3)/\text{local\_}fyC(F3) < -0.1 \quad (3).$$

Below the lower limit, the negative power becomes too strong on the hit point of the F3 eye center ray on the transmissive surface C and the surface shape of the transmissive surface C becomes largely curved toward the eye side, thus increasing the thickness of the display optical system. Above the upper limit, conversely, the negative power becomes too weak on the hit point. The power layout of the surfaces on the F3 eye center ray is a retro-type power layout in which the transmissive surface C has a strong negative power on this hit point. This power layout enables the liquid crystal display to be placed at the farthest possible position on the F3 eye center ray so that the optical surface A of the illumination optical system can be placed. Accordingly, the negative power at this point becomes too weak in the range above the upper limit and there is no space for the interposition of the optical surface A of the illumination optical system. The upper limit is more preferably set to satisfy the following value.

$$-0.6 < \text{local\_}fy(F3)/\text{local\_}fyC(F3) < -0.25 \quad (3a)$$

This ensures an adequate space for the interposition of the optical surface 5 of the illumination optical system.

In another aspect of the image display apparatus of the present invention, the illumination optical system and the display optical system share the optical surface A having the both functions of transmission and reflection with each other; the optical surface A has a curvature on the local meridional section (the plane including the incident light and emergent light of the reference ray emitted from the illumination means and passing the center of the image of the display means and the center of the pupil); the apparatus satisfies the following condition:

$$0.1 < \text{local\_}fyA/\text{local\_}fy21\ 1.0 \quad (4),$$

where local_fy is a focal length in the local meridional section of the display optical system and local_fyA is a focal length in the local meridional section of only the optical surface A in the illumination optical system; the rays emitted from the illumination means illuminate the display means via the illumination optical system using the optical surface A as a reflective surface; and the reflected light from the display means is transmitted by the optical surface A, is reflected by a plurality of reflective surfaces, and thereafter is guided to the eye.

The display optical system herein is an optical system from the reflective liquid crystal display 3 as a display means to the surface immediately before the eye E. The illumination optical system is an optical system from the illumination light source 4 to the surface immediately before the display means (reflective liquid crystal display) 3. The focal length in the local meridional section will be described in the section of the embodiments.

The optical surface 5(A) is a half mirror. Below the lower limit of Condition (4), the power of the optical surface A in the illumination optical system becomes too strong when the light from the illumination light source illuminates the reflective liquid crystal display 3 almost normally as illustrated in FIG. 1. In this shape the depression of the optical surface A of the concave mirror becomes deep and thus the spacing needs to be set long between the liquid crystal surface and the optical surface A on the reference ray, thus increasing the size of the apparatus in this direction. Above the upper limit, the power of the optical surface A becomes too weak when the light from the illumination light source illuminates the reflective liquid crystal display in oblique incidence thereto as illustrated in FIG. 6. It thus becomes necessary to use a large light source for flat illumination (flat illumination light source) and place the flat illumination light source apart from the optical surface A, thus increasing the size of the apparatus. If the distance is maintained between the flat illumination light source and the optical surface A, the imaging relation (Köhler illumination) between the flat illumination light source and the eye will be deteriorated, thus dropping the light utilization efficiency. Either of these inconveniences will occur in the range over the upper limit. The upper limit is preferably set to satisfy the following condition:

$$0.1 < \text{local\_}fyA/\text{local\_}fy21\ 0.85 \quad (4a).$$

In this range the flat illumination light source is not so apart from the optical surface A and the well-balanced imaging relation is achieved with little deterioration of the imaging relation (Köhler illumination) between the flat illumination light source and the eye. The optical surface A in the illumination optical system is a reflective curvature surface with a positive refracting power on the local meridional section. Since this enables the positive reflective curvature surface to enlarge the illumination light source and illuminate the reflective liquid crystal display, a small illumination light source is applicable, so that the illumination optical system itself can be constructed in compact structure. It is desirable to increase the light utilization efficiency by keeping the illumination light source and the eye in almost imaging relation (Köhler illumination) as much as possible.

In the present invention, the illumination optical system may consist of a plurality of such optical surfaces A having power, but the configuration with only one surface can decrease the optical path lengths from the illumination light source to the reflective liquid crystal display, thus enabling compactification of the apparatus.

As for the display optical system, the light from the reflective liquid crystal display is transmitted by the optical surface A of the half mirror and the rays are folded by a plurality of reflective surfaces, thus decreasing the thickness of the display optical system. When the plurality of reflective surfaces are decentered curvature surfaces, there is no need for use of a separate refracting lens or the like, because the plurality of reflective surfaces themselves have power. In addition, a compact display optical system can be constructed by adequately setting the decentering amounts of the reflective curvature surfaces.

In a further aspect of the image display apparatus of the present invention, the apparatus has the reflective display means; the illumination optical system and the display optical system share the optical surface A(5) having the both functions of transmission and reflection with each other and the optical surface A(5) has a curvature on the local meridional section (the plane including the incident light and emergent light of the reference ray emitted from the illumination light source means and passing the center of the image of the display means and the center of the eye); there exists a lens body having another curved surface B(5a) on the opposite side of the optical surface A to the display means; the rays emitted from the illumination light source means are reflected by the optical surface A of the lens body (boomerang lens) to illuminate the display means, the reflected light from the display means is transmitted this time by the optical surface A to emerge from the lens body (boomerang lens), the light is then reflected by a plurality of reflective surfaces, and thereafter the light is guided to the eye to form an enlarged image of the image displayed on the display means; where local_ryA represents a radius of curvature in the local meridional section at a point of intersection with the reference ray on the optical surface A of the lens body (boomerang lens) in the display optical system and local_ryB a radius of curvature in the local meridional section at a point of intersection with the reference ray on the other curved surface B, local_ryA and local_ryB have the same sign and satisfy the following condition:

$$0.4 < \text{local\_}ryA/\text{local\_}ryB21\ 2.0 \quad (5).$$

The display optical system herein consists of the members placed in the optical paths from the reflective liquid crystal display of the display means to the surface immediately before the eye. The illumination optical system consists of the members placed in the optical paths from the illumination light source to the surface immediately before the display means (reflective liquid crystal display). The radii of curvatures in the local meridional section will be described in the section hereinafter.

Below the lower limit of Condition (5), the lens body (boomerang lens) consisting of the optical surface A and the curved surface B increases its thickness at the edge on the outermost image height F3 side of the far side from the eye, in the outermost image on the local meridional section of the display means. Above the upper limit, the lens body (boomerang lens) consisting of the optical surface A and the curved surface B decreases its thickness at the edge on the eye side in the oblique incidence illumination system as in Embodiments 6 to 8, and thus the lens body (boomerang lens) has to be constructed in increased thickness as a whole. Thus the apparatus tends to increase its size.

Since the lens body (boomerang lens) in Embodiments 1 to 5 (the normal incidence illumination systems) has the size shorter than that of the oblique incidence illumination systems (i.e., since the length in the longitudinal direction in the YZ section is shorter than that of the oblique incidence illumination systems), the upper limit of Condition (5) is preferably set as in Eq. (5a) below. Over the upper limit of 1.3 of this condition, the edge thickness on the eye side becomes too small.

$$0.4 < \text{local\_}ryA/\text{local\_}ryB < 1.3 \qquad (5a)$$

Although the image display apparatus of the present invention may include a plurality of such optical surfaces A having the power, the construction with only one surface can decrease the optical path lengths from the illumination light source to the reflective liquid crystal display and thus facilitates the compactification of the apparatus.

As for the display optical system, the light from the reflective liquid crystal display is transmitted by the optical surface A of the half mirror and the optical surface B and the rays are folded by a plurality of reflective surfaces (6, 13), thereby decreasing the thickness of the display optical system in the horizontal direction. When the plurality of reflective surfaces are decentered curvature surfaces, there is no need for use of a separate refracting lens or the like, because the plurality of reflective surfaces themselves have the power. In addition, the compact display optical system can be attained by properly setting the decentering amounts of the reflective curvature surfaces. The lens body 7 may be of non power under the condition of ryA=ryB.

The image display apparatus of the present invention has the reflective display means, the illumination light source means, the illumination optical system, and the display optical system; there exists a lens body having an optical curvature surface A having the both functions of transmission and reflection, shared between the illumination optical system and the display optical system, and another curved surface B on the opposite side of the optical curvature surface A to the display means; the rays emitted from the illumination light source means are reflected by the optical curvature surface A of the lens body to illuminate the display means, the reflected light from the display means is transmitted this time by the optical curvature surface A to emerge from the lens body, the emerging light is reflected by a plurality of reflective surfaces, and thereafter the light is guided to the eye to form an enlarged image.

In this structure, in the outermost image on the local meridional section of the display means (the plane including the incident light and emergent light of the reference ray emitted from the illumination light source means and passing the center of the image of the display means and the center of the eye), an F3 eye center ray represents a ray passing the center of the eye and the outermost image height F3 on the far side from the eye and an F2 eye center ray represents a ray passing the center of the eye and the outermost image height F2 on the near side to the eye; then the optical path length of the F3 eye center ray is set longer than that of the F2 eye center ray in the lens body in the display optical system.

In general, in the case of the display optical system consisting of only the free-form surface prism and the reflective LCD, it becomes difficult to ensure an adequate space (back focus) between the free-form surface prism and the LCD on the F3 image height side as the angle of view of the free-form surface prism becomes wider.

For the reflective LCD, the lens body (boomerang lens) needs to be interposed in this space. When the thickness of the lens body (boomerang lens) on the F3 image height side is larger than the thickness of the lens body (boomerang lens) on the F2 image height side, the back focus on the F3 image height side becomes shorter as to reduced back focuses in air of the spacing between the free-form surface prism and the LCD, which facilitates attainment of good optical performance at wide angles of view. By employing the lens body of such thicknesses, it becomes easier to arrange the reflective LCD surface and the entrance surface of the free-form surface prism in parallel and the telecentric optical system is established to the reflective LCD (as to the F3 image height and F2 image height), which is most suitable for the optical system of normal incidence illumination.

In the image display apparatus according to the present invention, it becomes feasible to further decrease the size of the entire apparatus and permit the observer to observe the image information in a good condition, by employing further aspects described below.

The illumination light source means is an RGB time division light source for emitting multiple-color light beams of red, green, blue, etc. in time division, and the display means is a display for displaying images of R, G, and B in time division in synchronism with emission of the R, G, B color light beams from the RGB time division light source.

In general, for color display of a filter method, a color filter of three colors of R, G, and B is placed in front of the liquid crystal, and thus the number of actual color display pixels is one third of the total number of pixels. In contrast, when the reflective liquid crystal display of time division display as described is used in combination with the LEDs of the three colors (R, G, and B), the total number of pixels becomes one third of that of the color filter type liquid crystal display and thus the size of the liquid crystal display becomes smaller if the number of color display pixels is the same. In connection therewith, the illumination optical system and the display optical system both can be constructed in smaller size.

In an optical system having a decentered, reflective curvature surface, there occurs decentering aberration rotationally asymmetric in the screen. Therefore, the display optical system includes two or more surfaces with refracting powers differing depending upon azimuth angles and the entire display optical system has a positive refracting power.

By employing the surface (free-form surface) with refracting powers differing depending upon azimuth angles, it becomes feasible to correct the rotationally asymmetric decentering aberration. By using two or more free-form surfaces, it becomes feasible to approximately equate the positive total focal lengths on the local meridional section and on the local sagittal section of the display optical system with each other and implement enlargement projection at the same ratio as the aspect ratio of the liquid crystal display.

It is preferable to make the lens body (boomerang lens) of a glass member. In many use methods of the reflective liquid crystal displays at present, one polarizer 1 is placed in the illumination optical system and another polarizer 2 is in the display optical system. However, since the region between the reflective liquid crystal display and the polarizer in the display optical system is in the optical relation of parallel Nicols in the display optical system, it is not preferable to place a material with strong birefringence in this region, because the observer observes the photoelasticity of the material.

The lens body (boomerang lens) is interposed in this region. When the lens body is made of the glass member, the lens body has no birefringence at all, the observer will not observe the photoelasticity of the material, and thus the apparatus can provide a good image of the display system.

It is preferable to employ a cylindrical surface having a power only in the meridional section as the optical surface A of the lens body. Since this configuration has no power in the direction of the sagittal section or the local sagittal section, occurrence of aberration can be minimized on the local sagittal section. Since the surface shape is not curved in the direction of the sagittal section or the local sagittal section, the reflective LCD 3 can be placed close to the optical surface A, which facilitates the compactification and the increase of the angle of view.

It is also preferable to employ a cylindrical surface as the other curved surface B of the lens body, similar to the optical surface A. This facilitates suppression of aberration occurrence in the lens body (boomerang lens) in the display optical system.

It is preferable to employ a half mirror of metal as the optical surface A of the lens body. The reason is as follows. If a half mirror of a multilayer dielectric film is used, the reflectances of the P-polarized light and the S-polarized light are different from each other and a retardation occurs in either of the two polarizations. The light from the illumination light source is converted into the linearly polarized light by the polarizer 1 and the linearly polarized light is reflected by the optical surface A. Depending upon angles of incidence to the optical surface A, the linearly polarized light is changed to elliptically polarized light upon the reflection on the optical surface A. After such elliptically polarized light is reflected by the reflective LCD, the polarizer fails to adequately cut the unwanted light, which will result in degrading the contrast of the display optical system. However, the use of the metal half mirror can avoid such inconvenience and thus attain good image quality.

In the display optical system the curvature in the local meridional section of the optical curvature surface A of the lens body is preferably stronger than the curvature in the local meridional section of the other curved surface B. Namely, the radius of the curvature of the optical curvature surface A is preferably shorter than the radius of the curvature of the curved surface B. This configuration can increase the thickness on the F3 image height side and also decrease the size of the illumination optical system.

It is preferable to arrange so that the optical path lengths in the lens body in the display optical system of eye center rays at respective image heights, which pass the image heights and the center of the eye, on the local meridional section of the display means, become gradually longer from the F2 eye center ray side to the F3 eye center ray side. This makes it easier to establish the telecentric optical system at all the image heights and makes the optical system more suitable for the normal incidence illumination.

The local-paraxial axis used in each embodiment of the present invention will be described below. FIG. 1 to FIG. 8 are the cross-sectional views of the main part of Numerical Examples 1 to 8, described hereinafter, of the present invention (views in the local meridional section, with a suffix of y), and the coordinate system at the vertex of surface for the first surface (eye 1) is presented in FIG. 1. Since in the present invention a vertex of each surface has only a shift in the y-axis direction and a tilt about the x-axis, the general meridional section and the local meridional section are identical, but the general sagittal section and the local sagittal section of each surface are different. The general meridional section and sagittal section described previously are the definitions on the general-paraxial axis, and the local meridional section and local sagittal section are the definitions on the local-paraxial axis described below. Further, definitions will also be described below for local curvature radius, local surface spacing, local focal length, and local refracting power adapted for the decentered systems.

In the present invention, the reference ray La is defined as a ray emitted from the illumination light source means 4 and passing the image center 3a of the display means 3 and the center 1a of the eye 1, and the local curvature radius, local surface spacing, local focal length, and local refracting power on the basis of a hit point (incidence point) of the reference ray on each surface are used instead of the general radius of curvature, surface spacing, focal length, and refracting power on the basis of a vertex of each surface.

The local curvature radius herein means a local radius of curvature on a hit point in an optical surface (a radius of curvature on the local meridional section or a radius of curvature on the local sagittal section). The local surface spacing means a value of distance (distance on the reference ray; a value without reduction to air) between two hit points in a surface of interest and in a subsequent surface. The local focal length is a value calculated by the conventional focal length calculating method (paraxial tracing) from the local curvature radius, the refractive indices before and after a surface of interest, and the local surface spacing. The local refracting power is an inverse of the local focal length.

Presented in each embodiment of the present invention are the general curvature radii, surface spacings, decentering amounts, refractive indices, and Abbe's numbers, and the local curvature radii, refractive indices of surfaces, local surface spacings, and local focal lengths.

Eight embodiments are presented according to the present invention. Numerical data of Embodiments 1 to 8 is presented in Table 1 to Table 8 and the optical path sectional diagrams in FIGS. 1 to 8. In Table 1 to Table 8, under the section of (general-paraxial axis) there are provided columns of the radius ry of curvature in the meridional section, the radius rx of curvature in the sagittal section, the surface spacing d (in the direction parallel to the vertex coordinate system of the first surface), the decentering amounts (a parallel decentering amount as shift and an inclination decentering amount as tilt (°) of a vertex of each surface relative to the vertex coordinate system of the first surface, on the meridional section), the refractive index nd for d-line, and the Abbe's number vd; FFS represents a free-form surface, YTO a cylindrical surface having a refracting power only in the meridional section, and AL an aspherical surface. A surface with M represents a reflective surface and the refractive index nd for d-line thereof is given an opposite sign. Table 1 to Table 8 present the numerical data obtained by the backward tracing from the eye to the liquid crystal display and to the illumination light source. The signs are determined so that a sign is positive when the principal rays travel from left to right and a sign negative in the opposite traveling direction.

The defining equation of FFS (free-form surface) is as follows (in a coordinate system at a vertex of each surface).

$z = \frac{1}{2} * (1/a + 1/b) * (y^2$ $* \cos(c)^2 + x^2) / \cos(c) / (1 + \frac{1}{2}$ $* (1/a - 1/b) * y * \sin(c) + (1$ $+ (1/a - 1/b) * y$

*sin(c)−(1/a/b+¼

*tan(c)2*(1/a+1/b)2)*x2)

(½))+c20*x2+c11*x*y+c02

*y2+c30*x3+c21*c03*y3

+c40*x4+c31*x3*y+c22*x2*y2

+c13*x*y3+c04*y4+c50*x5

+c41*x4*y+c32*x3*y2+c23

*x2*y3+c14*x*y4+c05*y5

+c60*x6+c51*x5*y+c42*c42

*x4*y2+c33*x3*y3+c24

*x2*y4+c15*x*y5+c06*y6

Coefficients a, b, c, c20, c11, c02 ... are coefficients of free-form surface. (Note: in the case of this definition of the free-form surface, the free-form surface coefficients also include coefficients associated with the paraxial region, and thus the values of the meridional-section-curvature radius ry and sagittal-section-curvature radius rx on the general-paraxial axis do not agree with the actual meridional-section-curvature radius ry and sagittal-sectional-curvature radius rx on the vertex. Therefore, there are also provided the actual meridional-section-curvature radius ry and sagittal-section-curvature radius rx on the point (0, 0), i.e., on the vertex.)

As for the defining equation of YTO, the meridional section is expressed by the following aspherical surface equation (in the vertex coordinate system of each surface):

$$z = \frac{y^2/ry}{1+\mathrm{SQRT}(1-(1+k)y^2/ry^2)+by^4+cy^6+dy^8+ey^{10}}$$

and the sagittal section is a plane (rx=∞).

The defining equation of AL is given by the following equation for rotationally symmetric, aspherical surfaces (in the vertex coordinate system of each surface).

$$z = \frac{h^2/r}{1+\mathrm{SQRT}(1-(1+k)h^2/r^2)+bh^4+ch^6+dh^8+eh^{10}}$$

where $h^2=x^2+y^2$, r=rx=rx.

Under the section of (local-paraxial axis) there are provided columns of local curvature radii local-ry and local-rx, local surface spacing local-d (with an opposite sign for a reflective surface), local focal lengths local-fy and local-fx, and refractive index nd of each surface (with an opposite sign for a reflective surface). There are also presented coordinates of a hit point on each surface (with a vertex at 0, 0), total local focal lengths of the display optical system, angles of view, and local focal lengths of the optical surface A of the illumination optical system.

Further, Table 1 to Table 5 includes after the section of (local-paraxial axis) a table of local paraxial ray <FOV: Wy=−10.59 deg Wx=0 deg> in the last part to present columns of local curvature radii local-ry, local-rx, local surface spacing local-d (with an opposite sign for a reflective surface), local focal lengths local-fy, local-fx, refractive index nd of each surface (with an opposite sign for a reflective surface), coordinates of a hit point on each surface (with a vertex at 0, 0), and total local focal lengths of the display optical system, on a hit point between each surface and the ray passing the center of the eye and the outermost image F3 of LCD (on the lower side or on the far side from the eye, FOV: Wy=−10.59 deg Wx=0 deg) on the local meridional section of LCD, different from a hit point between the reference ray and each surface. In this case the numerical data and calculated values were obtained by substituting the reference ray on the local paraxial axis into the ray passing the center of the eye and the LCD outermost image F3 (on the lower side).

TABLE 1

| | | n | ry | rx | d | shift | tilt | nd | vd |
|---|---|---|---|---|---|---|---|---|---|
| | | 1 | 0.00000 | 0.00000 | 21.947 | 0.000 | 0.000 | 1.000 | |
| FFS | | 2 | 0.00000 | 0.00000 | 6.473 | 2.667 | 7.722 | 1.571 | 33.80 |
| FFS-M | | 3 | 0.00000 | 0.00000 | −6.473 | 0.033 | −19.492 | −1.571 | 33.80 |
| FFS-M | | 4 | 0.00000 | 0.00000 | 1.778 | 2.667 | 7.722 | 1.571 | 33.80 |
| FFS | | 5 | 0.00000 | 0.00000 | 0.404 | 13.917 | 57.886 | 1.000 | |
| | | 6 | 0.00000 | 0.00000 | 0.101 | 14.561 | 59.670 | 1.490 | 40.00 |
| | | 7 | 0.00000 | 0.00000 | 0.361 | 14.734 | 59.670 | 1.000 | |
| YTO | | 8 | 15.79325 | 0.00000 | 2.669 | 15.177 | 59.670 | 1.697 | 55.53 |
| YTO | | 9 | 14.54570 | 0.00000 | −4.021 | 15.719 | 76.083 | 1.000 | |
| | | 10 | 0.00000 | 0.00000 | 4.950 | 16.715 | 46.947 | 1.000 | |
| | | 11 | 0.00000 | 0.00000 | 0.427 | 22.013 | 46.947 | 1.574 | 55.00 |
| M | | 12 | 0.00000 | 0.00000 | −0.427 | 22.470 | 46.947 | −1.574 | 55.00 |
| | | 13 | 0.00000 | 0.00000 | −0.929 | 22.013 | 46.947 | −1.000 | |
| YTO-M | | 14 | 14.54570 | 0.00000 | −10.826 | 15.719 | 76.083 | 1.000 | |
| | | 15 | 0.00000 | 0.00000 | 0.752 | 18.402 | 59.917 | 1.000 | |
| | | 16 | 0.00000 | 0.00000 | 0.000 | 17.104 | 59.917 | 1.000 | |
| FFS | 2 | a = −1.3632e-03 | b = −1.7771e-03 | c = 6.5563e+01 | | | | | |
| | | c02 = −3.0283e-03 | c03 = 3.5287e-04 | c04 = −2.7502e-05 | c05 = 9.8039e-07 | c06 = 2.6505e-08 | | | |
| | | c20 = −4.2727e-03 | c21 = −1.0561e-05 | c22 = 3.5505e-05 | c23 = 1.25460-06 | c24 = −5.7129e-09 | | | |
| | | c40 = −2.8801e-06 | c41 = 1.1232e-06 | c42 = 7.0465e-08 | c60 = 2.6610e-08 | | | | |
| FFS | 3 | a = −2.0158e-02 | b = −2.2515e-02 | c = −2.7354e+1 | | | | | |
| | | c02 = −6.2330e-04 | c03 = 1.3989e-04 | c04 = −1.6025e-05 | c05 = 1.2214e-06 | c06 = −4.7580e-08 | | | |
| | | c20 = −4.7237e-04 | c21 = 2.5720e-05 | c22 = 1.0699e-05 | c23 = 1.0623e-06 | c24 = −5.3514e-08 | | | |
| | | c40 = −1.0723e-06 | c41 = 2.1844e-07 | c42 = −5.3233e-09 | c60 = 9.9350e-09 | | | | |

TABLE 1-continued

| | | | | | | |
|---|---|---|---|---|---|---|
| FFS | 4 | a = −1.3632e-03 | b = −1.7771e-03 | c = 6.5563e+01 | | |
| | | c02 = −3.0283e-03 | c03 = 3.5287e-04 | c04 = −2.7502e-05 | c05 = 9.8039e-07 | c06 = −2.6S08e-08 |
| | | c20 = −4.2727e-03 | c21 = −1.0561e-05 | c22 = −3.5505e-05 | c23 = 1.2546e-06 | c24 = −5.71290e-09 |
| | | c40 = −2.8801e-06 | c41 = 1.1232e-06 | c42 = 7.0465e-08 | c60 = 2.6610e-08 | |
| FF5 | 5 | a = −1.3851e-03 | b = 1.6017e-03 | c = −8.9533e+01 | | |
| | | c02 = 1.0510e-02 | c03 = −2.1540e-03 | c04 = −1.3580e-04 | c05 = 3.1244e-05 | c06 = 8.2444e-07 |
| | | c20 = −2.1651e-03 | c21 = −8.2899e-04 | c22 = 6.6575e-05 | c23 = 2.2146e-05 | c24 = 3.4349e-07 |
| | | c40 = 4.2718e-05 | c41 = 9.4940e-06 | c42 = −6.7378e-07 | | |
| YTO | 8 | k = 0.0000e+00 b = 0.0000e+00 c = 0.0000e+00 d = 0.0000e+00 e = 0.0000e+00 | | | | |
| YTO | 9 | k = 0.0000e+00 b = 0.0000e+00 c = 0.0000e+00 d = 0.0000e+00 e = 0.0000e+00 | | | | |
| YTO | 14 | k = 0.0000e+00 b = 0.0000e+00 c = 0.0000e+00 d = 0.0000e+00 e = 0.0000e+00 | | | | |

| n | point (y,x) | ry | rx |
|---|---|---|---|
| 2 | ( 0.000, 0.000 ) | −149.115 | −81.032 |
| 3 | ( 0.000, 0.000 ) | −49.511 | −40.052 |
| 4 | ( 0.000, 0.000 ) | −149.115 | −81.032 |
| 5 | ( 0.000, 0.000 ) | 47.570 | 111.617 |
| 6 | ( 0.000, 0.000 ) | 0.000 | 0.000 |
| 7 | ( 0.000, 0.000 ) | 0.000 | 0.000 |
| 8 | ( 0.000, 0.000 ) | 15.793 | 0.000 |
| 9 | ( 0.000, 0.000 ) | 14.546 | 0.000 |
| 10 | ( 0.000, 0.000 ) | 0.000 | 0.000 |
| 11 | ( 0.000, 0.000 ) | 0.000 | 0.000 |
| 12 | ( 0.000, 0.000 ) | 0.000 | 0.000 |
| 13 | ( 0.000, 0.000 ) | 0.000 | 0.000 |
| 14 | ( 0.000, 0.000 ) | 14.546 | 0.000 |

(local - paraxial axis)

| | n | local-ry | local-rx | local-fy | local-fx | local-d | nd |
|---|---|---|---|---|---|---|---|
| FFS | 2 | −65.86306 | −77.83357 | −115.367 | −136.335 | 6.222 | 1.571 |
| FFS-M | 3 | −49.93133 | −40.06358 | 15.893 | 12.752 | −9.333 | −1.571 |
| FFS-M | 4 | −392.95249 | −75.39880 | −125.072 | −23.999 | 7.716 | 1.571 |
| FFS | 5 | 28.19217 | 79.09123 | −49.382 | −138.538 | 0.765 | 1.000 |
| | 6 | 0.00000 | 0.00000 | 0.000 | 0.000 | 0.200 | 1.490 |
| | 7 | 0.00000 | 0.00000 | 0.000 | 0.000 | 0.431 | 1.000 |
| YTO | 8 | 15.79325 | 0.00000 | 22.665 | 0.000 | 1.778 | 1.697 |
| YTO | 9 | 14.54570 | 0.00000 | −20.875 | 0.000 | 2.337 | 1.000 |
| | 10 | 0.00000 | 0.00000 | 0.000 | 0.000 | 7.253 | 1.000 |
| | 11 | 0.00000 | 0.00000 | 0.000 | 0.000 | 0.625 | 1.574 |
| | 12 | 0.00000 | 0.00000 | 0.000 | 0.000 | −0.625 | −1.574 |
| | 13 | 0.00000 | 0.00000 | 0.000 | 0.000 | −5.102 | −1.000 |
| YTO-M | 14 | 14.54570 | 0.00000 | 7.273 | 0.000 | 0.000 | 1.000 |

| n | hitpoint( y,x) |
|---|---|
| 2 | ( −2.687, 0.000 ) |
| 3 | ( 0.222, 0.000 ) |
| 4 | ( 3.699, 0.000 ) |
| 5 | ( −2.082, 0.000 ) |
| 6 | ( −2.112, 0.000 ) |
| 7 | ( −2.121, 0.000 ) |
| 8 | ( −2.686, 0.000 ) |
| 9 | ( −0.630, 0.000 ) |
| 10 | ( −4.229, 0.000 ) |
| 11 | ( −4.022, 0.000 ) |
| 12 | ( −4.010, 0.000 ) |
| 13 | ( −3.999, 0.000 ) |
| 14 | ( −0.270, 0.000 ) |

| local_fy(2 = 9) | local_fx(2 = 9) | 2Wy | 2Wx |
|---|---|---|---|
| 23.150 | 21.697 | 21.18 | 28.00 |

| local_fy(14 = 14) | | local_fx(14 = 14) |
|---|---|---|
| 7.273 | | 0.000 | local__fyA/local_fy = 0.314
local__ryA/local__ryB = 0.921

(local paraxial ray <POV: Wyx = 10.59 deg Wx = 0.00 deg>)
(F3)

| | n | local-ry | local-rx | local-fy | local-fx | local-d | nd |
|---|---|---|---|---|---|---|---|
| FF5 | 2 | −22.83422 | −60.89300 | −39.997 | −106.661 | 3.940 | 1.571 |
| FFS-M | 3 | −30.19519 | −38.13394 | 9.611 | 12.138 | −6.006 | −1.571 |
| FFS-M | 4 | −60.11737 | −76.97507 | −19.135 | 24.500 | 13.293 | 1.571 |
| FFS | 5 | −12.87314 | 67.32549 | 22.549 | −117.929 | 0.475 | 1.000 |
| | 6 | 0.00000 | 0.00000 | 0.000 | 0.000 | 0.200 | 1.490 |
| | 7 | 0.00000 | 0.00000 | 0.000 | 0.000 | 1.802 | 1.000 |

TABLE 1-continued

|     | 8 | 15.79325 | 0.00000 | 22.665 | 0.000 | 2.473 | 1.697 |
| YTO | 9 | 14.54570 | 0.00000 | −20.875 | 0.000 | 0.000 | 1.000 |

| n | hitpoint( y,x ) |
|---|---|
| 2 | ( −6.893, 0.000 ) |
| 3 | ( −5.113, 0.000 ) |
| 4 | ( −3.008, 0.000 ) |
| 5 | ( −6.275, 0.000 ) |
| 6 | ( −6.288, 0.000 ) |
| 7 | ( −6.295, 0.000 ) |
| 8 | ( −6.926, 0.000 ) |
| 9 | ( −4.939, 0.000 ) | local_fy(2 = 9) = 15.091    local_fx(2 = 9) = 23.899 local_fy(F3)/local_fyC(F3) = −0.377

TABLE 2

(general - paraxial axis)

|        | n  | ry | rx | d | shift | tilt | nd | vd |
|--------|----|----|----|----|----|----|----|----|
|        | 1  | 0.00000 | 0.00000 | 21.573 | 0.000 | 0.000 | 1.000 | |
| FFS    | 2  | 0.00000 | 0.00000 | 6.137 | 1.664 | 5.834 | 1.571 | 33.80 |
| FFS-M  | 3  | 0.00000 | 0.00000 | −6.137 | −0.426 | −20.682 | −1.571 | 33.80 |
| FFS-M  | 4  | 0.00000 | 0.00000 | 2.495 | 1.664 | 5.834 | 1.571 | 33.80 |
| FFS    | 5  | 0.00000 | 0.00000 | 0.342 | 13.511 | 56.351 | 1.000 | |
|        | 6  | 0.00000 | 0.00000 | 0.104 | 14.024 | 58.596 | 1.490 | 40.00 |
|        | 7  | 0.00000 | 0.00000 | −1.056 | 14.195 | 58.596 | 1.000 | |
| AL     | 8  | 17.29108 | 17.29108 | 2.902 | 15.074 | 58.596 | 1.697 | 55.53 |
| AL     | 9  | 15.43623 | 15.43623 | −4.152 | 15.158 | 72.224 | 1.000 | |
|        | 10 | 0.00000 | 0.00000 | 5.540 | 16.489 | 44.926 | 1.000 | |
|        | 11 | 0.00000 | 0.00000 | 0.443 | 22.015 | 44.926 | 1.574 | 55.00 |
| M      | 12 | 0.00000 | 0.00000 | −0.443 | 22.457 | 44.926 | −1.574 | 55.00 |
|        | 13 | 0.00000 | 0.00000 | −1.388 | 22.015 | 44.926 | −1.000 | |
| AL-M   | 14 | 15.43623 | 15.43623 | −11.171 | 15.158 | 72.224 | 1.000 | |
|        | 15 | 0.00000 | 0.00000 | 0.000 | 19.723 | 76.592 | 1.000 | |
|        | 16 | 0.00000 | 0.00000 | 0.000 | 19.723 | 76.592 | 1.000 | |

| FFS | 2 | a = −7.5175e−04 | b = −1.3587e−03 | c = 7.2877e−01 | | |
|---|---|---|---|---|---|---|
| | | c02 = −2.5081e−03 | c03 = 3.7442e−04 | c04 = −2.5559e−05 | c05 = 7.2384e−07 | c06 = −2.96100e−08 |
| | | c20 = −4.2478e−03 | c21 = 9.5056e−05 | c22 = −4.4631e−05 | c23 = 1.6447e−06 | c24 = 1.6209e−08 |
| | | c40 = −1.3083e−06 | c41 = 8.1249e−07 | c42 = 5.5620e−08 | c60 = 2.6769e−08 | |
| FFS | 3 | a = −1.9485e−02 | b = −2.1742e−02 | c = −3.1537e−01 | | |
| | | c02 = −3.2010e−03 | c03 = 1.0738e−04 | c04 = −1.8734e−05 | c05 = 1.2301e−06 | c06 = −4.0060e−08 |
| | | c20 = −4.0535e−05 | c21 = 4.4563e−05 | c22 = −1.6554e−05 | c23 = 1.3124e−06 | c24 = −5.1782e−08 |
| | | c40 = −1.1831e−06 | c41 = 1.2609e−07 | c42 = 7.9342e−09 | c60 = 1.5330e−08 | |
| FFS | 4 | a = −7.517e−04 | b = −1.3587e−03 | c = 7.2877e+01 | | |
| | | c02 = −2.5081e−03 | c03 = 3.7442e−04 | c04 = −2.5559e−05 | c05 = 7.2384e−07 | c06 = −2.9610e−08 |
| | | c20 = −4.2478e−03 | c21 = 9.5056e−05 | c22 = −4.4631e−05 | c23 = 1.6447e−06 | c24 = −1.6209e−08 |
| | | c40 = −1.3083e−06 | c41 = 8.1249e−07 | c42 = 5.5620e−08 | c60 = 2.6769e−08 | |
| FFS | 5 | a = −1.4367e−03 | b = 1.5621e−03 | c = −8.9614e+01 | | |
| | | c02 = 7.1382e−03 | c03 = −2.3347e−03 | c04 = −2.1835e−04 | c05 = 2.1697e−05 | c06 = 1.0962e−06 |
| | | c20 = −6.3564e−03 | c21 = −2.8956e−04 | c22 = 1.6186e−04 | c23 = 1.2976e−05 | c24 = −1.9711e−06 |
| | | c40 = 8.1220e−05 | c41 = 9.6181e−07 | c42 = −2.1079e−06 | c60 = −8.3802e−07 | |
| AL | 8 | k = −1.3503e+00 | b = −8.2803e−06 | c = −2.5354e−07 | d = 4.5637e−09 | e = −3.9637e−11 |
| AL | 9 | k = 7.5443e−01 | b = −1.0462e−04 | c = 8.0655e−07 | d = −1.2461e−08 | e = 8.0597e−11 |
| AL | 14 | k = 7.5443e−01 | b = 1.0462e−04 | c = 8.0655e−07 | d = −1.2461e−08 | e = 8.0597e−11 |

| n | point ( y,x ) | ry | rx |
|---|---|---|---|
| 2 | ( 0.000, 0.000 ) | −187.725 | −82.783 |
| 3 | ( 0.000, 0.000 ) | −54.917 | −41.208 |
| 4 | ( 0.000, 0.000 ) | 187.725 | −82.783 |
| 5 | ( 0.000, 0.000 ) | 70.043 | −294.807 |
| 6 | ( 0.000, 0.000 ) | 0.000 | 0.000 |
| 7 | ( 0.000, 0.000 ) | 0.000 | 0.000 |
| 8 | ( 0.000, 0.000 ) | 17.291 | 17.291 |
| 9 | ( 0.000, 0.000 ) | 15.436 | 15.436 |
| 10 | ( 0.000, 0.000 ) | 0.000 | 0.000 |
| 11 | ( 0.000, 0.000 ) | 0.000 | 0.000 |
| 12 | ( 0.000, 0.000 ) | 0.000 | 0.000 |
| 13 | ( 0.000, 0.000 ) | 0.000 | 0.000 |
| 14 | ( 0.000, 0.000 ) | 15.436 | 15.436 |

TABLE 2-continued

(local - paraxial axis)

| | n | local-ry | local-rx | local-fy | local-fx | local-d | nd |
|---|---|---|---|---|---|---|---|
| FFS | 2 | −99.87626 | −78.96097 | −174.945 | −138.310 | 6.212 | 1.571 |
| FFS-M | 3 | −55.88621 | −41.26578 | 17.788 | 13.134 | −9.237 | −1.571 |
| FFS-M | 4 | −2108.66768 | −77.88397 | −671.165 | −24.790 | 7.649 | 1.571 |
| FFS | 5 | 34.99204 | −616.99277 | −61.293 | 1080.737 | 0.657 | 1.000 |
| | 6 | 0.00000 | 0.00000 | 0.000 | 0.000 | 0.201 | 1.490 |
| | 7 | 0.00000 | 0.00000 | 0.000 | 0.000 | 0.491 | 1.000 |
| AL | 8 | 18.97864 | 17.53019 | 27.237 | 25.158 | 1.488 | 1.697 |
| AL | 9 | 15.55922 | 15.45952 | −22.330 | −22.187 | 2.359 | 1.000 |
| | 10 | 0.00000 | 0.00000 | 0.000 | 0.000 | 7.833 | 1.000 |
| | 11 | 0.00000 | 0.00000 | 0.000 | 0.000 | 0.625 | 1.574 |
| N | 12 | 0.00000 | 0.00000 | 0.000 | 0.000 | −0.625 | −1.574 |
| | 13 | 0.00000 | 0.00000 | 0.000 | 0.000 | −5.770 | −1.000 |
| AL-M | 14 | 15.44018 | 15.43698 | 7.720 | 7.718 | 0.000 | 1.000 |

| n | hitpoint( y,x ) |
|---|---|
| 2 | ( −1.672, 0.000 ) |
| 3 | ( 0.669, 0.000 ) |
| 4 | ( 4.727, 0.000 ) |
| 5 | ( −1.691, 0.000 ) |
| 6 | ( −1.739, 0.000 ) |
| 7 | ( −1.754, 0.000 ) |
| 8 | ( −3.166, 0.000 ) |
| 9 | ( −0.743, 0.000 ) |
| 10 | ( −4.632, 0.000 ) |
| 11 | ( −4.284, 0.000 ) |
| 12 | ( −4.266, 0.000 ) |
| 13 | ( −4.249, 0.000 ) |
| 14 | ( −0.132, 0.000 ) |

| local_fy(2 = 9) | local_fx(2 = 9) | 2Wy | 2Wx |
|---|---|---|---|
| 23.841 | 21.080 | 21.18 | 28.00 | local_fy(14 = 14) 7.720   local_fx(14 = 14) 7.718 local_fyA/local_fy = 0.324

(local paraxial ray <FOV: Wy = −10.59 deg Wx = 0.00 deg>)
(F3)

| | n | local-ry | local-rx | local-fy | local-fx | local-d | nd |
|---|---|---|---|---|---|---|---|
| FFS | 2 | −31.30732 | −59.37983 | −54.839 | −104.011 | 3.990 | −1.571 |
| FFS-M | 3 | −35.63261 | −38.97381 | 11.341 | 12.405 | −6.018 | 1.571 |
| FFS-M | 4 | −92.46057 | −78.19183 | −29.429 | −24.888 | 13.066 | 1.571 |
| FFS | 5 | −25.91236 | 685.08704 | 45.389 | −1200.012 | 0.499 | 1.000 |
| | 6 | 0.00000 | 0.00000 | 0.000 | 0.000 | 0.200 | 1.490 |
| | 7 | 0.00000 | 0.00000 | 0.000 | 0.000 | 1.688 | 1.000 |
| AL | 8 | 34.46585 | 19.11355 | 49.463 | 27.431 | 2.061 | 1.697 |
| AL | 9 | 18.13210 | 15.86329 | −26.022 | −22.766 | 0.000 | 1.000 |

| n | hitpoint( y,x ) |
|---|---|
| 2 | ( −5.782, 0.000 ) |
| 3 | ( −4.498, 0.000 ) |
| 4 | ( −1.901, 0.000 ) |
| S | ( −5.765, 0.000 ) |
| 6 | ( −5.794, 0.000 ) |
| 7 | ( −5.806, 0.000 ) |
| 8 | ( −7.314, 0.000 ) |
| 9 | ( −4.995, 0.000 ) | local_fy(2 = 9) 18.283   local_fx(2 = 9) 23.039 local_fy(F3)/local_fyC(F3) = −0.333
local_ryA/local_ryB = 0.820

TABLE 3

(general - paraxial axis)

| | n | ry | rx | d | shift | tilt | nd | vd |
|---|---|---|---|---|---|---|---|---|
| | 1 | 0.00000 | 0.00000 | 21.540 | 0.000 | 0.000 | 1.000 | |
| FFS | 2 | 0.00000 | 0.00000 | 6.339 | 2.062 | 6.225 | 1.571 | 33.80 |

TABLE 3-continued

| | | | | | | | | |
|---|---|---|---|---|---|---|---|---|
| FFS-M | 3 | 0.00000 | 0.00000 | −6.339 | 0.215 | −20.700 | −1.571 | 33.80 |
| FFS-M | 4 | 0.00000 | 0.00000 | 1.770 | 2.062 | 6.225 | 1.571 | 33.80 |
| FFS | 5 | 0.00000 | 0.00000 | −1.771 | 14.225 | 56.286 | 1.000 | |
| | 6 | 0.00000 | 0.00000 | 2.695 | 16.384 | 59.116 | 1.697 | 55.53 |
| YTO | 7 | 22.08045 | 0.00000 | −0.740 | 16.344 | 71.934 | 1.697 | 55.53 |
| | 8 | 0.00000 | 0.00000 | 0.920 | 25.735 | 53.407 | 1.000 | |
| | 9 | 0.00000 | 0.00000 | 0.414 | 26.974 | 48.565 | 1.574 | 55.00 |
| M | 10 | 0.00000 | 0.00000 | −0.414 | 27.442 | 48.565 | −1.574 | 55.00 |
| | 11 | 0.00000 | 0.00000 | −0.920 | 26.974 | 48.565 | −1.000 | |
| | 12 | 0.00000 | 0.00000 | 0.740 | 25.735 | 53.407 | −1.697 | 55.53 |
| YTO-M | 13 | 22.08045 | 0.00000 | −19.549 | 16.344 | 71.934 | 1.697 | 55.53 |
| | 14 | 0.00000 | 0.00000 | 0.000 | 22.721 | 86.722 | 1.000 | |
| | 15 | 0.00000 | 0.00000 | 0.000 | 22.721 | 86.722 | 1.000 | |
| FFS | 2 | $a$ = −1.8060e-03 | $b$ = −2.1909e-03 | $c$ = 7.4050e-01 | | | | |
| | | $c02$ = −1.5905e-03 | $c03$ = 4.0155e-04 | $c04$ = −2.4613e-05 | $c05$ = 3.7260e-07 | $c06$ = −3.6206e-08 | | |
| | | $c20$ = −5.1550e-03 | $c21$ = −7.7196e-05 | $c22$ = −2.2144e-06 | $c23$ = 5.8720e-07 | $c24$ = 4.1611e-09 | | |
| | | $c40$ = 2.6289e-06 | $c41$ = −1.7718e-07 | $c42$ = 2.7004e-08 | $c60$ = −7.8304e-09 | | | |
| FFS | 3 | $a$ = −2.0722e-02 | $b$ = −2.2394e-02 | $c$ = 3.2749e+01 | | | | |
| | | $c02$ = 5.8091e-06 | $c03$ = 4.9306e-05 | $c04$ = −1.8735e-05 | $c05$ = 1.0190e-06 | $c06$ = −3.4082e-08 | | |
| | | $c20$ = −1.1823e-03 | $c21$ = −1.0232e-05 | $c22$ = −5.2026e-06 | $c23$ = 2.0768e-07 | $c24$ = −3.3712e-08 | | |
| | | $c40$ = 4.3744e-07 | $c41$ = −1.6007e-07 | $c42$ = 2.3045e-09 | $c60$ = −1.5022e-09 | | | |
| FFS | 4 | $a$ = −1.8060e-03 | $b$ = −2.1909e-03 | $c$ = 7.4050e+01 | | | | |
| | | $c02$ = −1.5905e-03 | $c03$ = 4.0155e-04 | $c04$ = 2.4613e-05 | $c05$ = 3.7260e-07 | $c06$ = −3.6206e-08 | | |
| | | $c20$ = −5.1550e-03 | $c21$ = −7.7196e-05 | $c22$ = −2.2146e-06 | $c23$ = −5.8720e-07 | $c24$ = 4.1611e-09 | | |
| | | $c40$ = 2.6289e-06 | $c41$ = −1.7718e-07 | $c42$ = 2.7004e-08 | $c60$ = −7.8304e-09 | | | |
| FFS | 5 | $a$ = −4.6931e-03 | $b$ = −1.6538e-03 | $c$ = −6.8660e+03 | | | | |
| | | $c02$ = −8.8145e-03 | $c03$ = −3.5495e-03 | $c04$ = 3.1688e-04 | $c05$ = 4.0726e-05 | $c06$ = −2.7410e-06 | | |
| | | $c20$ = 3.6225e-03 | $c21$ = −1.5457e-03 | $c22$ = 7.6485e-05 | $c23$ = 4.3942e-05 | $c24$ = 2.3864e-06 | | |
| | | $c40$ = 2.1773e-05 | $c41$ = 8.1222e-06 | $c42$ = −5.2908e-09 | $c60$ = −2.4331e-07 | | | |
| YTO | 7 | $k$ = 0.0000e+00 $b$ = 0.0000e +00 $c$ = 0.00000+00 $d$ = 0.00000+00 $e$ = 0.00000+00 | | | | | | |
| YTO | 13 | $k$ = 0.0000e+00 $b$ = 0.0000e +00 $c$ = 0.00000+00 $d$ = 0.00000+00 $e$ = 0.00000+00 | | | | | | |

| n | point( y,x ) | | | ry | rx |
|---|---|---|---|---|---|
| 2 | ( | 0.000, 0.000 | ) | −268.081 | −56.875 |
| 3 | ( | 0.000, 0.000 | ) | −55.188 | −35.718 |
| 4 | ( | 0.000, 0.000 | ) | −268.081 | −56.875 |
| 5 | ( | 0.000, 0.000 | ) | −48.824 | 269.208 |
| 6 | ( | 0.000, 0.000 | ) | 0.000 | 0.000 |
| 7 | ( | 0.000, 0.000 | ) | 22.080 | 0.000 |
| 8 | ( | 0.000, 0.000 | ) | 0.000 | 0.000 |
| 9 | ( | 0.000, 0.000 | ) | 0.000 | 0.000 |
| 10 | ( | 0.000, 0.000 | ) | 0.000 | 0.000 |
| 11 | ( | 0.000, 0.000 | ) | 0.000 | 0.000 |
| 12 | ( | 0.000, 0.000 | ) | 0.000 | 0.000 |
| 13 | ( | 0.000, 0.000 | ) | 22.080 | 0.000 |
| 14 | ( | 0.000, 0.000 | ) | 0.000 | 0.000 |

(local - paraxial axle)

| | n | local-ry | local-rx | local-fy | local-fx | local-d | nd |
|---|---|---|---|---|---|---|---|
| FFS | 2 | −99.22407 | −57.32310 | −173.803 | −100.408 | 6.129 | 1.571 |
| FFS-M | 3 | −55.18528 | −35.71802 | 17.565 | 11.369 | −9.430 | −1.571 |
| FFS-M | 4 | 753.05851 | −51.62650 | 239.690 | −16.432 | 7.533 | 1.571 |
| FFS | 5 | 27.03153 | 92.87075 | −47.349 | −162.674 | 1.067 | 1.000 |
| | 6 | 0.00000 | 0.00000 | 0.000 | 0.000 | 2.180 | 1.697 |
| YTO | 7 | 22.08045 | 0.00000 | 0.000 | 0.000 | 6.007 | 1.697 |
| | 8 | 0.00000 | 0.00000 | 0.000 | 0.000 | 0.831 | 1.000 |
| | 9 | 0.00000 | 0.00000 | 0.000 | 0.000 | 0.629 | 1.574 |
| M | 10 | 0.00000 | 0.00000 | 0.000 | 0.000 | −0.629 | −1.574 |
| | 11 | 0.00000 | 0.00000 | 0.000 | 0.000 | −0.870 | −1.000 |
| | 12 | 0.00000 | 0.00000 | 0.000 | 0.000 | −6.897 | −1.697 |
| YTO-M | 13 | 22.08045 | 0.00000 | 6.507 | 0.000 | 7.914 | 1.697 |
| | 14 | 0.00000 | 0.00000 | 0.000 | 0.000 | 0.000 | 1.000 |

| n | hitpoint( y,x ) | | |
|---|---|---|---|
| 2 | ( | −2.073, 0.000 | ) |
| 3 | ( | −0.003, 0.000 | ) |
| 4 | ( | 4.656, 0.000 | ) |
| 5 | ( | −2.329, 0.000 | ) |
| 6 | ( | −5.028, 0.000 | ) |
| 7 | ( | −2.899, 0.000 | ) |
| 8 | ( | −8.530, 0.000 | ) |
| 9 | ( | −8.478, 0.000 | ) |
| 10 | ( | −8.405, 0.000 | ) |
| 11 | ( | −8.332, 0.000 | ) |
| 12 | ( | −8.072, 0.000 | ) |

TABLE 3-continued

| | | | | |
|---|---|---|---|---|
| 13 | ( | −0.852, 0.000 | ) | |
| 14 | ( | −18.498, 0.000 | ) | |
| local_fy(2 = 8) | local_fx(2 = 8) | 2Wy | | 2Wx |
| 21.703 | 21.751 | 21.18 | | 28.00 |
| | local_fy(13 = 13) | | local_fx(13 = 13) | |
| | 6.507 | | 0.000 | |
| | | local_fyA/local_fy = 0.300 | | |

(local paraxial ray <POV: Wy = −10.59 deg Wx = 0.00 deg>)

| | n | local-ry | local-rx | local-fy | local-fx | local-d | nd |
|---|---|---|---|---|---|---|---|
| FFS | 2 | −30.43035 | −55.42574 | −53.302 | −97.085 | 3.813 | 1.571 |
| FFS-M | 3 | −34.53758 | −35.23769 | 10.993 | 11.216 | −6.007 | −1.571 |
| FFS-M | 4 | −95.90363 | −57.31749 | −30.525 | −18.244 | 13.161 | 1.571 |
| FFS | 5 | −20.39264 | 67.13612 | 35.720 | −117.597 | 0.868 | 1.000 |
| | 6 | 0.00000 | 0.00000 | 0.000 | 0.000 | 4.056 | 1.697 |
| YTO | 7 | 22.08045 | 0.00000 | 0.000 | 0.000 | 3.755 | 1.697 |
| | 8 | 0.00000 | 0.00000 | 0.000 | 0.000 | 0.000 | 1.000 |

| n | hitpoint( y,x ) |
|---|---|
| 2 | ( −6.191, 0.000 ) |
| 3 | ( −5.189, 0.000 ) |
| 4 | ( −2.165, 0.000 ) |
| 5 | ( −6.126, 0.000 ) |
| 6 | ( −8.821, 0.000 ) |
| 7 | ( −7.074, 0.000 ) |
| 8 | ( −12.297, 0.000 ) |

| local_fy(2 = 8) | local_fx(2 = 8) |
|---|---|
| 16.490 | 25.769 | local_fy(F3)/local_fyC(F3) = −0.309

TABLE 4

(general - paraxial axle)

| | n | ry | rx | d | shift | tilt | nd | vd |
|---|---|---|---|---|---|---|---|---|
| | 1 | 0.00000 | 0.00000 | 21.540 | 0.000 | 0.000 | 1.000 | |
| FFS | 2 | 0.00000 | 0.00000 | 6.339 | 2.062 | 6.225 | 1.571 | 33.80 |
| FFS-M | 3 | 0.00000 | 0.00000 | −6.339 | 0.215 | −20.700 | −1.571 | 33.80 |
| FFS-M | 4 | 0.00000 | 0.00000 | 1.770 | 2.062 | 6.225 | 1.571 | 33.80 |
| FFS | 5 | 0.00000 | 0.00000 | −1.771 | 14.225 | 56.286 | 1.000 | |
| | 6 | 70.00000 | 70.00000 | 2.695 | 16.384 | 59.116 | 1.697 | 55.53 |
| AL | 7 | 20.00000 | 20.00000 | −0.740 | 16.344 | 71.934 | 1.697 | 55.53 |
| | 8 | 40.00000 | 40.00000 | 1.066 | 25.735 | 46.286 | 1.000 | |
| | 9 | 0.00000 | 0.00000 | 0.391 | 26.850 | 51.286 | 1.574 | 55.00 |
| M | 10 | 0.00000 | 0.00000 | −0.391 | 27.338 | 51.286 | −1.574 | 55.00 |
| | 11 | 0.00000 | 0.00000 | −1.066 | 26.850 | 51.286 | −1.000 | |
| | 12 | 40.00000 | 40.00000 | 0.740 | 25.735 | 46.286 | −1.697 | 55.53 |
| AL-M | 13 | 20.00000 | 20.00000 | −19.549 | 16.344 | 71.934 | 1.697 | 55.53 |
| | 14 | 0.00000 | 0.00000 | 0.000 | 22.721 | 86.726 | 1.000 | |
| | 15 | 0.00000 | 0.00000 | 0.000 | 22.721 | 86.726 | 1.000 | |
| FFS | 2 | a = −1.8060e-03 | b = −2.1909e-03 | c = 7.4050e+01 | | | | |
| | | c02 = −1.5905e-03 | c03 = 4.0155e-04 | c04 = −2.4613e-05 | c05 = 3.7260e-07 | c06 = −3.6206e-05 | | |
| | | c20 = −5.1550e-03 | c21 = −7.7196e-05 | c22 = −2.2146e-05 | c23 = −5.8720e-07 | c24 = 4.1611e-09 | | |
| | | c40 = 2.6289e-06 | c41 = −1.77180e-07 | c42 = 2.7004e-08 | c60 = −7.8304e-09 | | | |
| FFS | 3 | a = −2.0722e-02 | b = −2.2394e-02 | c = 3.2749e+01 | | | | |
| | | c02 = 5.8091e-06 | c03 = 4.9306e-05 | c04 = −1.8735e-05 | c05 = 1.0190e-06 | c06 = −3.4082e-08 | | |
| | | c20 = −1.1823e-03 | c21 = −1.0232e-05 | c22 = −5.2026e-06 | c23 = 2.07680e-07 | c24 = −3.3712e-08 | | |
| | | c40 = 4.3744e-07 | c41 = −1.6007e-07 | c42 = 2.3045e-09 | c60 = −1.5022e-09 | | | |
| FFS | 4 | a = −1.8060e-03 | b = −2.1909e-03 | c = 7.4050e+01 | | | | |
| | | c02 = −1.5905e-03 | c03 = 4.0155e-04 | c04 = −2.4613e-05 | c05 = 3.7260e-07 | c06 = −3.6206e-08 | | |
| | | c20 = −5.1550e-03 | c21 = −7.7196e-05 | c22 = −2.2146e-05 | c23 = 5.8720e-07 | c24 = 4.1611e-09 | | |
| | | c40 = 2.6289e-06 | c41 = −1.7718e-07 | c42 = 2.7004e-08 | c60 = −7.8304e-09 | | | |
| FFS | 5 | a = −4.6931e-03 | b = −1.6538e-03 | c = −6.8660e+03 | | | | |
| | | c02 = 8.8145e-03 | c03 = −3.5495e-03 | c04 = 3.1488e-04 | c05 = 4.0726e-05 | c06 = −2.7410e-06 | | |
| | | c20 = 3.6225e-03 | c21 = −1.5457e-03 | c22 = 7.6485e-05 | c23 = 4.3942e-05 | c24 = 2.3864e-06 | | |
| | | c40 = 2.1773e-05 | c41 = 8.1222e-06 | c42 = −5.2908e-09 | c60 = −2.4331e-07 | | | |
| AL | 7 | k = 0.0000e+00 | b = 1.0000e-05 | c = 0.0000e+00 | d = 0.00000e+00 | e = 0.00000e+00 | | |
| AL | 13 | k = 0.0000e+00 | b = 1.0000e-05 | c = 0.0000e+00 | d = 0.00000e+00 | e = 0.00000e+00 | | |

| n | point ( y,x ) | ry | rx |
|---|---|---|---|
| 2 | ( 0.000, 0.000 ) | −268.081 | 56.875 |
| 3 | ( 0.000, 0.000 ) | −55.188 | −35.718 |

TABLE 4-continued

| | | | | | |
|---|---|---|---|---|---|
| 4 | ( | 0.000, 0.000 | ) | −268.081 | −56.875 |
| 5 | ( | 0.000, 0.000 | ) | −48.824 | 269.208 |
| 6 | ( | 0.000, 0.000 | ) | 70.000 | 70.000 |
| 7 | ( | 0.000, 0.000 | ) | 20.000 | 20.000 |
| 8 | ( | 0.000. 0.000 | ) | 40.000 | 40.000 |
| 9 | ( | 0.000, 0.000 | ) | 0.000 | 0.000 |
| 20 | ( | 0.000, 0.000 | ) | 0.000 | 0.000 |
| 11 | ( | 0.000, 0.000 | ) | 0.000 | 0.000 |
| 12 | ( | 0.000, 0.000 | ) | 40.000 | 40.000 |
| 13 | ( | 0.000, 0.000 | ) | 20.000 | 20.000 |
| 14 | ( | 0.000, 0.000 | ) | 0.000 | 0.000 |

(local - paraxial axis)

| | n | local-ry | local-rx | local-fy | local-fx | local-d | nd |
|---|---|---|---|---|---|---|---|
| FFS | 2 | −99.22407 | −57.32310 | −173.803 | −100.408 | 6.129 | 1.571 |
| FFS-M | 3 | −55.18528 | −35.71802 | 17.565 | 11.369 | −9.430 | −1.571 |
| FFS-M | 4 | 753.05851 | −51.62650 | 239.690 | −16.432 | 7.533 | 1.571 |
| FFS | 5 | 27.03153 | 92.87075 | −47.349 | −162.674 | 1.249 | 1.000 |
| | 6 | 70.00000 | 69.81825 | 100.460 | 100.199 | 1.998 | 1.697 |
| | 7 | 19.63748 | 19.67019 | 0.000 | 0.000 | 5.856 | 1.697 |
| | 8 | 40.00000 | 39.13615 | −57.406 | −56.166 | 1.408 | 1.000 |
| | 9 | 0.00000 | 0.00000 | 0.000 | 0.000 | 0.627 | 1.574 |
| | 10 | 0.00000 | 0.00000 | 0.000 | 0.000 | −0.627 | −1.574 |
| | 11 | 0.00000 | 0.00000 | 0.000 | 0.000 | −1.463 | −1.000 |
| | 12 | 40.00000 | 39.23089 | −57.406 | −56.302 | −6.456 | −1.697 |
| AL-M | 13 | 19.92023 | 19.93097 | 5.870 | 5.873 | 8.003 | 1.697 |
| | 14 | 0.00000 | 0.00000 | 0.000 | 0.000 | 0.000 | 1.000 |

| n | hitpoint( y ,x ) |
|---|---|
| 2 | ( −2.073, 0.000 ) |
| 3 | ( −0.003, 0.000 ) |
| 4 | ( 4.656, 0.000 ) |
| 5 | ( −2.329, 0.000 ) |
| 6 | ( −5.041, 0.000 ) |
| 7 | ( −2.847, 0.000 ) |
| 8 | ( −8.268, 0.000 ) |
| 9 | ( −7.998, 0.000 ) |
| 10 | ( −7.947. 0.000 ) |
| 11 | ( −7.896, 0.000 ) |
| 12 | ( −7.806, 0.000 ) |
| 13 | ( −1.299, 0.000 ) |
| 14 | ( −19.199, 0.000 ) |

| local_fy(2 = 8) | local_fx(2 = 8) | 2Wy | 2Wx |
|---|---|---|---|
| 21.173 | 20.866 | 21.18 | 28.00 |

| local_fy(13 = 13) | | local_fx(13 = 13) | |
|---|---|---|---|
| 5.870 | | 5.873 | | local_fyA/local_fy = 0.277

(local paraxial ray <FOV: Wy = −10.59 deg Wx = 0.00 deg>)

| | n | local-ry | local-rx | local-fy | local-fx | local-d | nd |
|---|---|---|---|---|---|---|---|
| FFS | 2 | −30.43035 | −55.42574 | −53.302 | −97.085 | 3.813 | 1.571 |
| FFS-M | 3 | −34.53758 | −35.23769 | 10.993 | 11.216 | −6.007 | −1.571 |
| FFS-M | 4 | −95.90363 | −57.31749 | −30.525 | −18.244 | 13.161 | 1.571 |
| FFS | 5 | −20.39264 | 67.13612 | 35.720 | −117.597 | 1.431 | 1.000 |
| | 6 | 70.00000 | 69.43745 | 100.460 | 99.652 | 3.550 | 1.697 |
| AL | 7 | 18.50633 | 18.11272 | 0.000 | 0.000 | 4.030 | 1.697 |
| | 8 | 40.00000 | 38.23028 | −57.406 | −54.866 | 0.000 | 1.000 |

| n | hitpoint ( y,x ) |
|---|---|
| 2 | ( −6.191, 0.000 ) |
| 3 | ( −5.189, 0.000 ) |
| 4 | ( −2.165, 0.000 ) |
| 5 | ( −6.126, 0.000 ) |
| 6 | ( −8.857, 0.000 ) |
| 7 | ( −6.922, 0.000 ) |
| 8 | ( −11.766, 0.000 ) |

| local_fy(2 = 8) | | local_fx(2 = 8) | |
|---|---|---|---|
| 15.675 | | 25.194 | | local_fy(P3)/local_fyC(F3) = −0.294

TABLE 5

(general - paraxial axis)

|  | n | ry | rx | d | shift | tilt | nd | vd |
|---|---|---|---|---|---|---|---|---|
|  | 1 | 0.00000 | 0.00000 | 21.540 | 0.000 | 0.000 | 1.000 |  |
| FFS | 2 | 0.00000 | 0.00000 | 6.339 | 2.062 | 6.225 | 1.571 | 33.80 |
| FFS-M | 3 | 0.00000 | 0.00000 | −6.339 | 0.215 | −20.700 | −1.571 | 33.80 |
| FFS-M | 4 | 0.00000 | 0.00000 | 1.759 | 2.062 | 6.225 | 1.571 | 33.80 |
| FFS | 5 | 0.00000 | 0.00000 | 0.000 | 14.325 | 71.225 | 1.000 |  |
|  | 6 | 0.00000 | 0.00000 | −1.950 | 14.325 | 61.225 | 1.000 |  |
|  | 7 | 0.00000 | 0.00000 | 1.985 | 16.324 | 76.225 | 1.000 |  |
| YTO | 8 | 25.00000 | 0.00000 | 5.673 | 15.234 | 73.225 | 1.697 | 55.53 |
|  | 9 | 70.00000 | 70.00000 | 0.262 | 20.563 | 58.346 | 1.000 |  |
|  | 10 | 0.00000 | 0.00000 | 0.328 | 20.988 | 58.346 | 1.574 | 55.00 |
| M | 11 | 0.00000 | 0.00000 | −0.328 | 21.520 | 58.346 | −1.574 | 55.00 |
|  | 12 | 0.00000 | 0.00000 | −0.262 | 20.988 | 58.346 | −1.000 |  |
|  | 13 | 70.00000 | 70.00000 | −5.673 | 20.563 | 58.346 | −1.697 | 55.53 |
| YTO-M | 2.4 | 25.00000 | 0.00000 | −19.688 | 15.234 | 73.225 | 1.697 | 55.53 |
|  | 15 | 0.00000 | 0.00000 | 0.000 | 21.169 | 85.431 | 1.000 |  |
|  | 16 | 0.00000 | 0.00000 | 0.000 | 21.169 | 85.431 | 1.000 |  |

FFS 2
$a = 1.8060e{-}03$  $b = -2.1909e{-}03$  $c = 7.4050e{+}01$
$c02 = -1.5905e{-}03$  $c03 = 4.0155e{-}04$  $c04 = -2.4613e{-}05$  $c05 = 3.7260e{-}07$  $c06 = -3.6206e{-}08$
$c20 = -5.1550e{-}03$  $c21 = -7.7196e{-}05$  $c22 = -2.2146e{-}05$  $c23 = -5.8720e{-}07$  $c24 = 4.1611e{-}09$
$c40 = 2.6289e{-}06$  $c41 = -1.7718e{-}07$  $c42 = 2.7004e{-}08$  $c60 = -7.8304e{-}09$

FFS 3
$a = -2.0722e{-}02$  $b = -2.2394e{-}02$  $c = -3.2749e{+}01$
$c02 = 5.8091e{-}06$  $c03 = 4.9306e{-}05$  $c04 = -1.8735e{-}05$  $c05 = 1.0190e{-}06$  $c06 = -3.4082e{-}08$
$c20 = -1.1823e{-}03$  $c21 = -1.0232e{-}05$  $c22 = -5.2026e{-}06$  $c23 = 2.0768e{-}07$  $c24 = -3.3712e{-}08$
$c40 = 4.3744e{-}07$  $c41 = -1.6007e{-}07$  $c42 = 2.3045e{-}09$  $c60 = -1.5022e{-}09$

FFS 4
$a = -1.8060e{-}03$  $b = -2.1909e{-}03$  $c = 7.4050e{+}01$
$c02 = -1.5905e{-}03$  $c03 = 4.0155e{-}04$  $c04 = -2.4613e{-}05$  $c05 = 3.7260e{-}07$  $c06 = -3.6206e{-}08$
$c20 = -5.1550e{-}03$  $c21 = -7.7196e{-}05$  $c22 = -2.2146e{-}05$  $c23 = -5.8720e{-}07$  $c24 = 4.1611e{-}09$
$c40 = 2.6289e{-}06$  $c41 = -1.7718e{-}07$  $c42 = 2.7004e{-}08$  $c60 = -7.8304e{-}09$

FFS 5
$a = -4.6931e{-}03$  $b = -1.6538e{-}03$  $c = -6.8660e{+}03$
$c02 = -8.8145e{-}03$  $c03 = -3.5495e{-}03$  $c04 = 3.1688e{-}04$  $c05 = 4.072e{-}05$  $c06 = -2.7410e{-}06$
$c20 = 3.6225e{-}03$  $c21 = -1.5457e{-}03$  $c22 = 7.6485e{-}05$  $c23 = 4.3942e{-}05$  $c24 = 2.3864e{-}06$
$c40 = 2.1773e{-}05$  $c41 = 8.1222e{-}06$  $c42 = -5.2908e{-}09$  $c60 = -2.4331e{-}07$

YTO 8  $k = 0.00000e{+}00$  $b = 0.0000e{+}00$  $c = 0.0000e{+}00$  $d = 0.0000e{+}00$  $e = 0.0000e{+}00$
YTO 14 $k = 0.00000e{+}00$  $b = 0.0000e{+}00$  $c = 0.0000e{+}00$  $d = 0.0000e{+}00$  $e = 0.0000e{+}00$

| n | point (y,x) | ry | rx |
|---|---|---|---|
| 2 | ( 0.000, 0.000 ) | −268.081 | −56.875 |
| 3 | ( 0.000, 0.000 ) | −55.188 | −35.718 |
| 4 | ( 0.000, 0.000 ) | −268.081 | −56.875 |
| 5 | ( 0.000, 0.000 ) | −48.824 | 269.208 |
| 6 | ( 0.000, 0.000 ) | 0.000 | 0.000 |
| 7 | ( 0.000, 0.000 ) | 0.000 | 0.000 |
| 8 | ( 0.000, 0.000 ) | 25.000 | 0.000 |
| 9 | ( 0.000, 0.000 ) | 70.000 | 70.000 |
| 10 | ( 0.000, 0.000 ) | 0.000 | 0.000 |
| 11 | ( 0.000, 0.000 ) | 0.000 | 0.000 |
| 12 | ( 0.000, 0.000 ) | 0.000 | 0.000 |
| 13 | ( 0.000, 0.000 ) | 70.000 | 70.000 |
| 14 | ( 0.000, 0.000 ) | 25.000 | 0.000 |
| 15 | ( 0.000, 0.000 ) | 0.000 | 0.000 |

(local - paraxial axis)

|  | n | local-ry | local-rx | local-fy | local-fx | local-d | nd |
|---|---|---|---|---|---|---|---|
| FFS | 2 | 99.22407 | −57.32310 | −173.803 | −100.408 | 6.129 | 1.571 |
| FFS-M | 3 | 55.18528 | −35.71802 | 17.565 | 11.369 | −9.430 | −1.571 |
| FFS-M | 4 | 753.05851 | −51.62650 | 239.690 | −16.432 | 8.253 | 1.571 |
| FFS | 5 | 24.89676 | 89.60754 | −43.610 | −156.958 | 0.446 | 1.000 |
|  | 6 | 0.00000 | 0.00000 | 0.000 | 0.000 | 2.412 | 1.000 |
|  | 7 | 0.00000 | 0.00000 | 0.000 | 0.000 | 0.624 | 1.000 |
| YTO | 8 | 25.00000 | 0.00000 | 35.878 | 0.000 | 6.455 | 1.697 |
|  | 9 | 70.00000 | 69.99520 | −100.460 | −100.453 | 0.496 | 1.000 |
|  | 10 | 0.00000 | 0.00000 | 0.000 | 0.000 | 0.626 | 1.574 |
| M | 11 | 0.00000 | 0.00000 | 0.000 | 0.000 | −0.626 | −1.574 |
|  | 12 | 0.00000 | 0.00000 | 0.000 | 0.000 | −0.498 | −1.000 |
|  | 13 | 70.00000 | 69.99659 | −100.460 | −100.455 | −6.728 | −1.697 |
| YTO-M | 14 | 25.00000 | 0.00000 | 7.367 | 0.000 | 8.374 | 1.697 |
|  | 15 | 0.00000 | 0.00000 | 0.000 | 0.000 | 0.000 | 1.000 |

| n | hitpoint (y,x) |
|---|---|
| 2 | ( −2.073, 0.000 ) |
| 3 | ( −0.003, 0.000 ) |

TABLE 5-continued (general - paraxial axis)

| n | hitpoint( y,x ) |
|---|---|
| 4 | ( 4.656, 0.000 ) |
| 5 | ( −2.481, 0.000 ) |
| 6 | ( −2.325, 0.000 ) |
| 7 | ( −5.838, 0.000 ) |
| 8 | ( −3.328, 0.000 ) |
| 9 | ( −0.820, 0.000 ) |
| 10 | ( −0.784, 0.000 ) |
| 11 | ( −0.755, 0.000 ) |
| 12 | ( −0.727, 0.000 ) |
| 13 | ( −0.691, 0.000 ) |
| 14 | ( −2.584, 0.000 ) |
| 15 | ( −20.499, 0.000 ) |

| local_fy(2 = 9) | local_fx(2 = 9) | 2Wy | 2Wx |
|---|---|---|---|
| 19.059 | 21.545 | 21.18 | 28.00 |

| local_fy(14 = 14) | | local_fx(14 = 14) | |
|---|---|---|---|
| 7.367 | | 0.000 | | local_fyA/local_fy = 0.387

(local paraxial ray <POV: Wy = −10.59 deg Wx = 0.00 deg>)

| | n | local-ry | local-rx | local-fy | local-fx | local-d | nd |
|---|---|---|---|---|---|---|---|
| FFS | 2 | −30.43035 | −55.42574 | −53.302 | −97.085 | 3.813 | 1.571 |
| FFS-M | 3 | −34.53758 | −35.23769 | 10.993 | 11.216 | −6.007 | −1.571 |
| FFS-M | 4 | −95.90363 | −57.31749 | −30.525 | −18.244 | 14.927 | 1.571 |
| FFS | 5 | −11.94558 | 68.10710 | 20.924 | −119.298 | 1.586 | 1.000 |
| | 6 | 0.00000 | 0.00000 | 0.000 | 0.000 | 3.446 | 1.000 |
| | 7 | 0.00000 | 0.00000 | 0.000 | 0.000 | 0.234 | 1.000 |
| YTO | 8 | 25.00000 | 0.00000 | 35.878 | 0.000 | 4.590 | 1.697 |
| | 9 | 70.00000 | 69.86394 | −100.460 | −100.264 | 0.000 | 1.000 |

| n | hitpoint( y,x ) |
|---|---|
| 2 | ( −6.191, 0.000 ) |
| 3 | ( −5.189, 0.000 ) |
| 4 | ( −2.165, 0.000 ) |
| S | ( −6.446, 0.000 ) |
| 6 | ( −5.877, 0.000 ) |
| 7 | ( −9.745, 0.000 ) |
| 8 | ( −7.621, 0.000 ) |
| 9 | ( −4.362, 0.000 ) |

| local_fy(2 = 9) | local_fx(2 = 9) |
|---|---|
| 15.495 | 25.506 | local_fy(F3)/local_fyC(F3) = −0.291

TABLE 6

(general - paraxial axle)

| | n | ry | rx | d | shift | tilt | nd | vd |
|---|---|---|---|---|---|---|---|---|
| | 1 | 0.00000 | 0.00000 | 20.730 | 0.000 | 0.000 | 1.000 | |
| FFS | 2 | 0.00000 | 0.00000 | 5.549 | 0.654 | 2.687 | 1.571 | 33.80 |
| FFS-M | 3 | 0.00000 | 0.00000 | −5.549 | −0.239 | −23.969 | −1.571 | 33.80 |
| FFS-M | 4 | 0.00000 | 0.00000 | 3.388 | 0.654 | 2.687 | 1.571 | 33.80 |
| PFS | 5 | 0.00000 | 0.00000 | 0.335 | 13.116 | 53.162 | 1.000 | |
| | 6 | 0.00000 | 0.00000 | 0.115 | 13.564 | 54.804 | 1.490 | 40.00 |
| | 7 | 0.00000 | 0.00000 | −2.236 | 13.727 | 54.804 | 1.000 | |
| | 8 | 29.79740 | 0.00000 | 2.719 | 15.549 | 54.804 | 1.697 | 55.53 |
| YTO | 9 | 26.23079 | 0.00000 | −4.566 | 14.982 | 59.935 | 1.000 | |
| | 10 | 0.00000 | 0.00000 | 5.747 | 17.625 | 32.793 | 1.000 | |
| | 11 | 0.00000 | 0.00000 | 0.525 | 21.327 | 32.793 | 1.574 | 55.00 |
| H | 12 | 0.00000 | 0.00000 | −0.525 | 21.666 | 32.793 | −1.574 | 55.00 |
| | 13 | 0.00000 | 0.00000 | −1.181 | 21.327 | 32.793 | −1.000 | |
| YTO-H | 14 | 26.23079 | 0.00000 | −8.996 | 14.982 | 59.935 | 1.000 | |
| | 15 | 0.00000 | 0.00000 | 0.00 | 20.189 | 83.736 | 1.000 | |
| | 16 | 0.00000 | 0.00000 | 0.000 | 20.189 | 83.736 | 1.000 | |
| FFS | 2 | a = −1.1593e-03 | b = −1.6398e-03 | c = 7.8071e+01 | | | | |
| | | c02 = −2.3509e-04 | c03 = 2.9994e-04 | c04 = −1.8926e-05 | c05 = 5.97090e-07 | c06 = −3.5850e-08 | | |
| | | c20 = −5.1589e-03 | c21 = 6.2380e-05 | c22 = −4.1939e-05 | c23 = 6.3222e-07 | c24 = −4.3747e-09 | | |
| | | c40 = 1.8711e-05 | c41 = 9.1172e-07 | c42 = 5.3936e-08 | c60 = −1.1446e-08 | | | |
| FFS | 3 | a = −1.9609e-02 | b = −2.3012e-02 | c = −3.5340e+01 | | | | |
| | | c02 = 3.9565e-04 | c03 = −7.3395e-05 | c04 = −9.5882e-06 | c05 = 1.2281e-06 | c06 = −6.3210e-08 | | |
| | | c20 = −1.8285e-03 | c21 = 1.3428e-06 | c22 = −1.1714e-05 | c23 = 1.4495e-06 | c24 = −9.3332e-08 | | |
| | | c40 = 5.8598e-06 | c41 = −1.3467e-06 | c42 = 1.1798e-09 | c60 = 4.3016e-09 | | | |

TABLE 6-continued

| | | | | | | |
|---|---|---|---|---|---|---|
| FFS | 4 | a = −1.1593e-03 | b = −1.6398e-03 | c = 7.8071e+01 | | |
| | | c02 = −2.3509e-04 | c03 = 2.9994e-04 | c04 = −1.8926e-05 | c05 = 5.9709e-07 | c06 = −3.5850e-08 |
| | | c20 = −5.1589e-03 | c21 = 6.2380e-05 | c22 = −4.1939e-05 | c23 = 6.3222e-07 | c24 = −4.3747e-09 |
| | | c40 = 1.8711e-05 | c41 = 9.1172e-07 | c42 = 5.3936e-O5 | c60 = −1.1446e-08 | |
| FFS | 5 | a = −1.4814e-03 | b = 1.5049e-03 | c = −8.9477e+01 | | |
| | | c02 = 1.4647e-02 | c03 = −3.5286e-03 | c04 = −7.2949e-04 | c05 = 7.8229e-05 | c06 = 8.3150e-06 |
| | | c20 = 2.7602e-03 | c21 = −1.1400e-03 | c22 = −2.3699e-05 | c23 = 2.9358e-05 | c24 = 2.5320e-06 |
| | | c40 = −1.0450e-04 | c41 = 8.7978e-06 | c42 = −1.9865e-06 | c60 = 1.3959e-06 | |
| YTO | 8 | k = 0.0000e+00 b = 0.0000e+00 c = 0.0000e+00 d = 0.0000+00 e = 0.0000e+00 | | | | |
| YTO | 9 | k = 0.0000e+00 b = 0.0000e+00 c = 0.0000e+00 d = 0.0000+00 e = 0.0000e+00 | | | | |
| YTO | 14 | k = 0.0000e+00 b = 0.0000e+00 c = 0.0000e+00 d = 0.0000+00 e = 0.0000e+00 | | | | |

| n | point ( y ,x ) | | ry | rx |
|---|---|---|---|---|
| 2 | ( | 0.000, 0.000 ) | −1316.712 | −58.517 |
| 3 | ( | 0.000, 0.000 ) | −60.268 | −33.578 |
| 4 | ( | 0.000, 0.000 ) | −1316.712 | −58.517 |
| 5 | ( | 0.000, 0.000 ) | 34.137 | 146.982 |
| 6 | ( | 0.000, 0.000 ) | 0.000 | 0.000 |
| 7 | ( | 0.000, 0.000 ) | 0.000 | 0.000 |
| 8 | ( | 0.000, 0.000 ) | 29.797 | 0.000 |
| 9 | ( | 0.000, 0.000 ) | 26.231 | 0.000 |
| 10 | ( | 0,000, 0.000 ) | 0.000 | 0.000 |
| 11 | ( | 0.000, 0.000 ) | 0.000 | 0.000 |
| 12 | ( | 0.000, 0.000 ) | 0.000 | 0.000 |
| 13 | ( | 0.000, 0.000 ) | 0.000 | 0.000 |
| 14 | C | 0.000, 0.000 ) | 26.231 | 0.000 |

(local - paraxial axis)

| | n | local-ry | local-rx | local-fy | local-fx | local-d | nd |
|---|---|---|---|---|---|---|---|
| FFS | 2 | −490.75204 | −58.11304 | −859.611 | −101.792 | 5.666 | 1.571 |
| FFS-M | 3 | −59.57166 | −33.56413 | 18.961 | 10.683 | −8.928 | −1.571 |
| FFS-M | 4 | 334,69263 | −52.17546 | 106.529 | −16.607 | 7.300 | 1.571 |
| FFS | 5 | 24.83268 | 109.98489 | −43.497 | −192.652 | 0.572 | 1.000 |
| | 6 | 0.00000 | 0.00000 | 0.000 | 0.000 | 0.200 | 1.490 |
| | 7 | 0.00000 | 0.00000 | 0.000 | 0.000 | 0.473 | 1.000 |
| YTO | 8 | 29.79740 | 0.00000 | 42.763 | 0.000 | 1.004 | 1.697 |
| YTO | 9 | 26.23079 | 0.00000 | −37.645 | 0.000 | 3.251 | 1.000 |
| | 10 | 0.00000 | 0.00000 | 0.000 | 0.000 | 7.141 | 1.000 |
| | 11 | 0.00000 | 0.00000 | 0.000 | 0.000 | 0.636 | 1.574 |
| M | 12 | 0.00000 | 0.00000 | 0.000 | 0.000 | −0.636 | −1.574 |
| | 13 | 0.00000 | 0.00000 | 0.000 | 0.000 | −5.432 | −1.000 |
| YTO-M | 14 | 26.23079 | 0.00000 | 13.115 | 0.000 | 0.000 | 1.000 |

| n | hitpoint( y,x ) | |
|---|---|---|
| 2 | ( | −0.654, 0.000 ) |
| 3 | ( | 0.365, 0.000 ) |
| 4 | ( | 6.102, 0.000 ) |
| 5 | ( | −1.053, 0.000 ) |
| 6 | ( | −1.085, 0.000 ) |
| 7 | ( | −1.096, 0.000 ) |
| 8 | ( | −4.013, 0.000 ) |
| 9 | ( | −1.466, 0.000 ) |
| 10 | ( | −6.920, 0.000 ) |
| 11 | ( | −4.857, 0.000 ) |
| 12 | ( | −4.740. 0.000 ) |
| 13 | ( | 4.624, 0.000 ) |
| 14 | ( | 1.811, 0.000 ) |

| local_fy(2 = 9) | local_fx(2 = 9) | 2Wy | 2Wx |
|---|---|---|---|
| 20.800 | 18.844 | 21.18 | 28.00 |
| local_fy(14 = 14) | | | local_fx(14 = 14) |
| 13.115 | | | 0.000 |
| | | local_fyA/local_fy = 0.631 | |
| | | local_ryA/local_ryB = 0.88 | |

TABLE 7

(general - paraxial axis)

| | n | ry | rx | d | shift | tilt | nd | vd |
|---|---|---|---|---|---|---|---|---|
| | 1 | 0.00000 | 0.00000 | 20.713 | 0.000 | 0.000 | 1.000 | |
| FFS | 2 | 0.00000 | 0.00000 | 5.615 | 0.487 | 2.903 | 1.571 | 33.80 |

TABLE 7-continued

| | | | | | | | | |
|---|---|---|---|---|---|---|---|---|
| FFS-M | 3 | 0.00000 | 0.00000 | −5.615 | −0.084 | −23.525 | −1.571 | 33.80 |
| FFS-M | 4 | 0.00000 | 0.00000 | 3.071 | 0.487 | 2.903 | 1.571 | 33.80 |
| FFS | 5 | 0.00000 | 0.00000 | 0.398 | 13.148 | 52.091 | 1.000 | |
| | 6 | 0.00000 | 0.00000 | 0.117 | 13.659 | 54.155 | 1.490 | 40.00 |
| | 7 | 0.00000 | 0.00000 | −1.152 | 13.821 | 54.155 | 1.000 | |
| YTO | 8 | 19.48S81 | 0.00000 | 1.588 | 14.900 | 54.155 | 1.697 | 55.53 |
| YTO | 9 | 31.16175 | 0.00000 | −4.272 | 15.305 | 59.856 | 1.000 | |
| | 10 | 0.00000 | 0.00000 | 5.929 | 17.786 | 32.062 | 1.000 | |
| | 11 | 0.00000 | 0.00000 | 0.530 | 21.500 | 32.062 | 1.574 | 55.00 |
| M | 12 | 0.00000 | 0.00000 | −0.530 | 21.831 | 32.062 | −1.574 | 55.00 |
| | 13 | 0.00000 | 0.00000 | −1.658 | 21.500 | 32.062 | −1.000 | |
| YTO-M | 14 | 31.16175 | 0.00000 | −8.924 | 15.305 | 59.856 | 1.000 | |
| | 15 | 0.00000 | 0.00000 | 0.000 | 20.487 | 83.990 | 1.000 | |
| | 16 | 0.00000 | 0.00000 | 0.000 | 20.487 | 83.990 | 1.000 | |
| FFS | 2 | $a = 1.1163e-03$ | | $b = -1.6003e-03$ | | $c = 7.7534e+01$ | | |
| | | $c02 = -5.3522e-04$ | | $c03 = 2.8361e-04$ | | $c04 = -1.7627e-05$ | $c05 = 6.1582e-07$ | $c06 = -3.7429e-08$ |
| | | $c20 = -5.0679e-03$ | | $c21 = 7.5338e-05$ | | $c22 = -4.1682e-05$ | $c23 = 8.41340e-07$ | $c24 = -1.1497e-09$ |
| | | $c40 = 1.9036e-05$ | | $c41 = 1.0092e-06$ | | $c42 = 7.5540e-08$ | $c60 = -7.46530e-09$ | |
| FFS | 3 | $a = -1.9428e-02$ | | $b = -2.2904e-02$ | | $c = -3.4646e-01$ | | |
| | | $c02 = 3.1599e-04$ | | $c03 = -7.0392e-05$ | | $c04 = -7.5362e-05$ | $c05 = 1.1197e-06$ | $c06 = -6.4823e-08$ |
| | | $c20 = -1.7000e-03$ | | $c21 = 1.1075e-05$ | | $c22 = -1.1258e-05$ | $c23 = 1.2401e-06$ | $c24 = -8.2386e-08$ |
| | | $c40 = 6.4644e-06$ | | $c41 = -9.6889e-08$ | | $c42 = 4.0587e-09$ | $c60 = 4.33810e-09$ | |
| FFS | 4 | $a = -1.1163e-03$ | | $b = -1.6003e-03$ | | $c = 7.7534e+01$ | | |
| | | $c02 = -5.3522e-04$ | | $c03 = 2.8361e-04$ | | $c04 = -1.7627e-05$ | $c05 = 6.1582e-07$ | $c06 = -3.7429e-08$ |
| | | $c20 = -5.0679e-03$ | | $c21 = 7.5338e-05$ | | $c22 = -4.1682e-05$ | $c23 = 8.4134e-07$ | $c24 = -1.1497e-09$ |
| | | $c40 = 1.9036e-05$ | | $c41 = 1.0092e-06$ | | $c42 = 7.5540e-08$ | $c60 = -7.4653e-09$ | |
| FFS | 5 | $a = -1.5738e-03$ | | $b = 1.4139e-03$ | | $c = -8.8013e+01$ | | |
| | | $c02 = 2.0513e-02$ | | $c03 = -3.8954e-03$ | | $c04 = -7.6113e-04$ | $c05 = 7.6018e-05$ | $c06 = 8.7094e-06$ |
| | | $c20 = 1.8730e-03$ | | $c21 = -9.3321e-04$ | | $c22 = 1.0807e-04$ | $c23 = 3.6438e-05$ | $c24 = 1.0655e-06$ |
| | | $c40 = -9.3048e-05$ | | $c41 = 8.1901e-06$ | | $c42 = -1.6780e-06$ | $c60 = 1.5041e-06$ | |
| YTO | 8 | k: 0.0000e+00 b: 0.0000e+00 c: 0.0000e+00 d = 0.0000e+00 e = 0.0000e+00 | | | | | | |
| YTO | 9 | k: 0.0000e+00 b: 0.0000e+00 c: 0.0000e+00 d = 0.0000e+00 e = 0.0000e+00 | | | | | | |
| YTO | 14 | k: 0.0000e+00 b: 0.0000e+00 c: 0.0000e+00 d = 0.0000e+00 e = 0.0000e+00 | | | | | | |

| n | point( y,x ) | ry | rx |
|---|---|---|---|
| 2 | ( 0.000, 0.000 ) | −733.324 | −60.871 |
| 3 | ( 0.000, 0.000 ) | −59.592 | −34.331 |
| 4 | ( 0.000, 0.000 ) | −733.324 | −60.871 |
| 5 | ( 0.000, 0.000 ) | 24.377 | 694.633 |
| 6 | ( 0.000, 0.000 ) | 0.000 | 0.000 |
| 7 | ( 0.000, 0.000 ) | 0.000 | 0.000 |
| 8 | ( 0.000, 0.000 ) | 19.486 | 0.000 |
| 9 | ( 0.000, 0.000 ) | 31.162 | 0.000 |
| 10 | ( 0.000, 0.000 ) | 0.000 | 0.000 |
| 11 | ( 0.000, 0.000 ) | 0.000 | 0.000 |
| 12 | ( 0.000, 0.000 ) | 0.000 | 0.000 |
| 13 | ( 0.000, 0.000 ) | 0.000 | 0.000 |
| 14 | ( 0.000, 0.000 ) | 31.162 | 0.000 |

| | | (local − paraxial axis) | | | | |
|---|---|---|---|---|---|---|
| | n | local-ry | local-rx | local-fy | local-fx | local-d | nd |
| FFS | 2 | −445.42161 | −60.52438 | −780.209 | −106.016 | 5.672 | 1.571 |
| FFS-M | 3 | −59.23828 | −34.32886 | 18.855 | 10.926 | −8.901 | −1.571 |
| FFS-M | 4 | 429.31705 | −54.65676 | 136.647 | −17.397 | 7.206 | 1.571 |
| | 5 | 18.81219 | 248.07892 | −32.952 | −434.540 | 0.655 | 1.000 |
| | 6 | 0.00000 | 0.00000 | 0.000 | 0.000 | 0.200 | 1.490 |
| | 7 | 0.00000 | 0.00000 | 0.000 | 0.000 | 0.418 | 1.000 |
| YTO | 8 | 19.48581 | 0.00000 | 27.965 | 0.000 | 1.277 | 1.697 |
| YTO | 9 | 31.16175 | 0.00000 | −44.721 | 0.000 | 3.372 | 1.000 |
| | 10 | 0.00000 | 0.00000 | 0.000 | 0.000 | 7.355 | 1.000 |
| | 11 | 0.00000 | 0.00000 | 0.000 | 0.000 | 0.637 | 1.574 |
| M | 12 | 0.00000 | 0.00000 | 0.000 | 0.000 | −0.637 | −1.574 |
| | 13 | 0.00000 | 0.00000 | 0.000 | 0.000 | −5.791 | −1.000 |
| YTO-M | 14 | 31.16175 | 0.00000 | 15.581 | 0.000 | 0.000 | 1.000 |

| n | hitpoint( y,x ) |
|---|---|
| 2 | ( −0.487, 0.000 ) |
| 3 | ( 0.204, 0.000 ) |
| 4 | ( 6.206, 0.000 ) |
| 5 | ( −1.280, 0.000 ) |
| 6 | ( −1.300, 0.000 ) |
| 7 | ( −1.309, 0.000 ) |
| 8 | ( −2.902, 0.000 ) |
| 9 | ( −1.837, 0.000 ) |
| 10 | ( −7.010, 0.000 ) |

TABLE 7-continued

| | | | | | |
|---|---|---|---|---|---|
| 11 | ( | | −4.741, 0.000 | ) | |
| 12 | ( | | −4.616, 0.000 | ) | |
| 13 | ( | | −4.491, 0.000 | ) | |
| 14 | ( | | 1.854, 0.000 | ) | |
| local_fy(2 = 9) | | local_fx(2 = 9) | 2Wy | | 2Wx |
| 20.050 | | 18.934 | 21.18 | | 28.00 |
| | | local_fy(14 = 14) | | | local_fx(14 = 14) |
| | | 15.581 | | | 0.000 |
| | | | local_fyA/local_fy = 0.777 | | |
| | | | local_ryA/local_ryB = 1.60 | | |

TABLE 8

(general - paraxial axis)

| | n | ry | rx | d | shift | tilt | nd | vd |
|---|---|---|---|---|---|---|---|---|
| | 1 | 0.00000 | 0.00000 | 20.730 | 0.000 | 0.000 | 1.000 | |
| FFS | 2 | 0.00000 | 0.00000 | 1.000 | 0.654 | 2.687 | 1.495 | 52.96 |
| FFS | 3 | 0.00000 | 0.00000 | 5.549 | 0.654 | 2.687 | 1.000 | |
| FFS-M | 4 | 0.00000 | 0.00000 | −5.549 | −0.239 | −23.969 | −1.000 | |
| FFS-M | 5 | 0.00000 | 0.00000 | 3.388 | 0.654 | 2.687 | 1.000 | |
| | 6 | 0.00000 | 0.00000 | 0.335 | 13.116 | 53.162 | 1.000 | |
| | 7 | 0.00000 | 0.00000 | 0.115 | 13.564 | 54.804 | 1.495 | 36.70 |
| | 8 | 0.00000 | 0.00000 | −2.236 | 13.727 | 54.804 | 1.000 | |
| YTO | 9 | 29.79740 | 0.00000 | 2.719 | 15.549 | 54.804 | 1.702 | 51.28 |
| YTO | 10 | 26.23079 | 0.00000 | −4.566 | 14.982 | 59.935 | 1.000 | |
| | 11 | 0.00000 | 0.00000 | 5.747 | 17.625 | 32.793 | 1.000 | |
| | 12 | 0.00000 | 0.00000 | 0.525 | 21.327 | 32.793 | 1.578 | 50.70 |
| M | 13 | 0.00000 | 0.00000 | −0.525 | 21.666 | 32.793 | −1.578 | 50.70 |
| | 14 | 0.00000 | 0.00000 | −1.181 | 21.327 | 32.793 | −1.000 | |
| YTO-M | 15 | 26.22988 | 0.00000 | −8.996 | 14.982 | 59.935 | 1.000 | |
| | 16 | 0.00000 | 0.00000 | 0.000 | 20.189 | 83.736 | 1.000 | |
| | 17 | 0.00000 | 0.00000 | 0.000 | 20.189 | 83.736 | 1.000 | |

| | | | | | | |
|---|---|---|---|---|---|---|
| FFS | 2 | $a = 1.1593e-03$ | $b = 1.6398e-03$ | $c = 7.8071e+01$ | | |
| | | $c02 = 2.3509e-04$ | $c03 = 2.9994e-04$ | $c04 = -1.8926e-05$ | $c05 = 5.9709e-07$ | $c06 = -3.5850e-08$ |
| | | $c20 = -5.1589e-03$ | $c21 = 6.2380e-05$ | $c22 = 4.1939e-05$ | $c23 = 6.3222e-07$ | $c24 = -4.3747e-09$ |
| | | $c40 = 1.8711e-05$ | $c41 = 9.1172e-07$ | $c42 = 5.3936e-08$ | $c60 = -1.1446e-08$ | |
| FFS | 3 | $a = 1.1593e-03$ | $b = -1.6398e-03$ | $c = 7.8071e+01$ | | |
| | | $c02 = 2.3509e-04$ | $c03 = 2.9994e-04$ | $c04 = 1.8926e-05$ | $c05 = 5.9709e-07$ | $c06 = -3.5850e-08$ |
| | | $c20 = -5.1589e-03$ | $c21 = 6.2380e-05$ | $c22 = 4.1939e-05$ | $c23 = 6.3222e-07$ | $c24 = -4.3747e-09$ |
| | | $c40 = 1.8711e-05$ | $c41 = 9.1172e-07$ | $c42 = 5.3936e-08$ | $c60 = 1.1446e-08$ | |
| FFS | 4 | $a = -1.9609e-03$ | $b = -2.8000e-02$ | $c = -3.5340e+01$ | | |
| | | $c02 = 3.9565e-04$ | $c03 = 7.3395e-05$ | $c04 = -9.5882e-06$ | $c05 = 1.2281e-06$ | $c06 = -6.3210e-08$ |
| | | $c20 = -1.8285e-03$ | $c21 = 1.3428e-06$ | $c22 = 1.1714e-05$ | $c23 = 1.4495e-06$ | $c24 = -9.3332e-08$ |
| | | $c40 = 5.8598e-06$ | $c41 = -1.3467e-07$ | $c42 = 1.1798e-09$ | $c60 = 4.3016e-09$ | |
| FFS | 5 | $a = -1.1593e-03$ | $b = 1.6398e-03$ | $c = 7.8071e+01$ | | |
| | | $c02 = -2.3509e-04$ | $c03 = 2.9994e-04$ | $c04 = 1.8926e-05$ | $c05 = 5.9709e-07$ | $c06 = -3.5850e-08$ |
| | | $c20 = -5.1589e-03$ | $c21 = 6.2380e-05$ | $c22 = -4.1939e-05$ | $c23 = 6.3222e-07$ | $c24 = -4.3747e-09$ |
| | | $c40 = 1.8711e-05$ | $c41 = 9.1172e-07$ | $c42 = 5.3930e-08$ | $c60 = -1.1446e-08$ | |
| YTO | 9 | $k = 0.0000e+00$ $b = 0.0000e+00$ $c = 0.0000e+00$ $d = 0.0000e+00$ $e = 0.0000e+00$ | | | | |
| YTO | 10 | $k = 0.0000e+00$ $b = 0.0000e+00$ $c = 0.0000e+00$ $d = 0.0000e+00$ $e = 0.0000e+00$ | | | | |
| YTO | 15 | $k = 0.0000e+00$ $b = 0.0000e+00$ $c = 0.0000e+00$ $d = 0.0000e+00$ $e = 0.0000e+00$ | | | | |

| n | point ( y,x ) | | | ry | rx |
|---|---|---|---|---|---|
| 2 | ( | 0.000, 0,000 | ) | 1316.712 | 58.517 |
| 3 | ( | 0.000, 0,000 | ) | −1316.712 | 58.517 |
| 4 | ( | 0.000, 0,000 | ) | −53.686 | 30.452 |
| 5 | ( | 0.000, 0,000 | ) | −1316.712 | −58.517 |
| 6 | ( | 0.000, 0,000 | ) | 0.000 | 0.000 |
| 7 | ( | 0.000, 0,000 | ) | 0.000 | 0.000 |
| 8 | ( | 0.000, 0,000 | ) | 0.000 | 0.000 |
| 9 | ( | 0.000, 0,000 | ) | 29.797 | 0.000 |
| 10 | ( | 0.000, 0,000 | ) | 26.231 | 0.000 |
| 11 | ( | 0.000, 0,000 | ) | 0.000 | 0.000 |
| 12 | ( | 0.000, 0,000 | ) | 0.000 | 0.000 |
| 13 | ( | 0.000, 0,000 | ) | 0.000 | 0.000 |
| 14 | ( | 0.000, 0,000 | ) | 0.000 | 0.000 |
| 15 | ( | 0.000, 0,000 | ) | 26.230 | 0.000 |

(local - paraxial axis)

| | n | local-ry | local-rx | local-fy | local-fx | local-d | nd |
|---|---|---|---|---|---|---|---|
| FFS | 2 | −490.75204 | −58.11304 | −991.464 | −117.405 | 0.999 | 1.495 |
| FFS | 3 | −498.62033 | −58.12521 | 1007.360 | 117.430 | 5.631 | 1.000 |

TABLE 8-continued

| | n | | | | | | |
|---|---|---|---|---|---|---|---|
| FFS-M | 4 | −53.19914 | −30.43192 | 26.600 | 15.216 | −8.714 | −1.000 |
| FFS-M | 5 | 316.17184 | −52.84504 | 158.086 | −26.423 | 7.538 | 1.000 |
| | 6 | 0.00000 | 0.00000 | 0.000 | 0.000 | 0.599 | 1.000 |
| | 7 | 0.00000 | 0.00000 | 0.000 | 0.000 | 0.200 | 1.495 |
| | 8 | 0.00000 | 0.00000 | 0.000 | 0.000 | 0.513 | 1.000 |
| YTO | 9 | 29.79740 | 0.00000 | 42.472 | 0.000 | 1.005 | 1.702 |
| YTO | 10 | 26.23079 | 0.00000 | −37.388 | 0.000 | 3.417 | 1.000 |
| | 11 | 0.00000 | 0.00000 | 0.000 | 0.000 | 7.187 | 1.000 |
| | 12 | 0.00000 | 0.00000 | 0.000 | 0.000 | 0.637 | 1.578 |
| M | 13 | 0.00000 | 0.00000 | 0.000 | 0.000 | −0.637 | −1.578 |
| | 14 | 0.00000 | 0.00000 | 0.000 | 0.000 | −5.435 | −1.000 |
| YTO-M | 15 | 26.22988 | 0.00000 | 13.115 | 0.000 | 0.000 | 1.000 |

| n | hitpoint( y,x ) |
|---|---|
| 2 | ( −0.654, 0.000 ) |
| 3 | ( −0.639, 0.000 ) |
| 4 | ( 0.278, 0.000 ) |
| 5 | ( 5.775, 0.000 ) |
| 6 | ( −1.360, 0.000 ) |
| 7 | ( −1.381, 0.000 ) |
| 8 | ( −1.389, 0.000 ) |
| 9 | ( −4.298, 0.000 ) |
| 10 | ( −1.738, 0.000 ) |
| 11 | ( −7.269, 0.000 ) |
| 12 | ( −5.051, 0.000 ) |
| 13 | ( −4.927, 0.000 ) |
| 14 | ( −4.802, 0.000 ) |
| 15 | ( 1.734, 0.000 ) |

| local_fy(2 = 10) | local_fx(2 = 10) | 2Wy | 2Wx |
|---|---|---|---|
| 24.002 | 20.048 | 15.07 | 20.00 |
| local_fy(15 = 15) | | local_fx(15 = 15) | |
| 13.115 | | 0.000 | | local_fyA/local_fy = 0.546
local_ryA/local_ryB = 0.88

Figure 9:
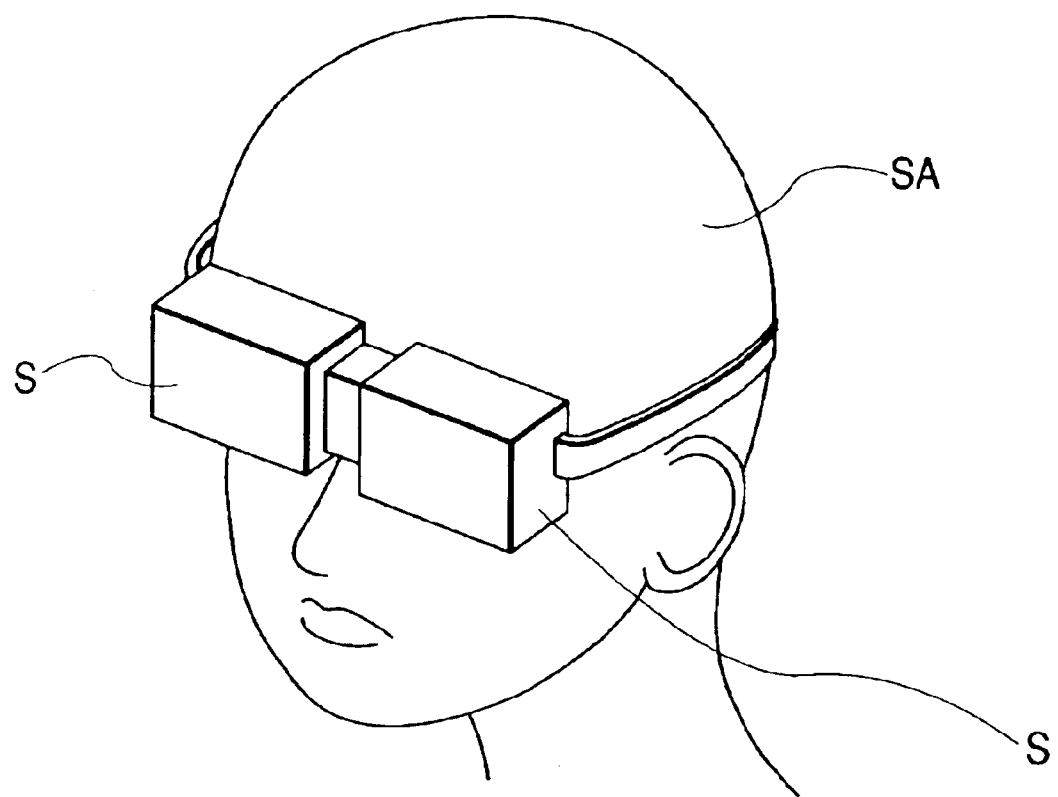
FIG. 9 is a schematic diagram to show the major part of an application of the image display apparatus of the present invention to the HMD.

FIG. 9 is an explanatory diagram to illustrate a configuration of a head mounted display of the binocular type in which a pair of image display apparatus S in each embodiment of the present invention are provided for the left and right eyes of the observer SA.

In the present invention an image observation system capable of implementing stereoscopic vision can be constructed, for example, by use of binocular parallax for images displayed on the display elements.

It is a matter of course that the head mounted display does not have to be equipped with the image display devices for the two eyes but it may be a monocular HMD provided with only one unit for either of the left and right eyes.

The present invention can realize the image observation apparatus enabling the observer to observe the image information with good image quality in the compact structure of the entire apparatus and in reduced loss of light amount by properly setting the structure of the illumination optical system from the light source means to the display means and the display optical system for guiding the light from the display means to the observer's eye in observation of the image information displayed on the display means such as the liquid crystal display or the like as described above, and also realize the head mounted displays using it.

Particularly, the present invention can provide the HMD with the reflective LCD reducing loss of light amount from the illumination light source, presenting the image quality in adequate contrast, and permitting construction of the compact illumination optical system and display optical system.

What is claimed is:

1. An image display apparatus comprising:

reflective display means;

illumination means for illuminating the display means;

an illumination optical system for guiding light from the illumination means to the display means;

a display optical system for guiding light from the display means to an observation position;

a first optical member used in common by said illumination optical system and said display optical system and having an optical surface (A) functioning as a reflecting surface in association with said illumination optical system and as a transmission surface in association with said display optical system; and a second optical member;

wherein light from said illumination means is reflected by said optical surface (A) and is guided to said display means;

wherein light from said display means is transmitted through said optical surface (A) and then is transmitted through said second optical member to be guided to the observation position, wherein, when a reference ray is defined as a ray which is illumination light from said illumination means that is reflected at the center of said display means and emerges therefrom and is incident on the center of a pupil, and a plane that includes incident light and exit light of the reference ray in each surface is defined as a local meridional section in each surface, the following condition is satisfied, 0.1<local.fyA/local.fy<1.0, where local.fy is a focal length of said display optical system in the local meridional section and local.fyA is a focal length of said optical surface (A), and wherein said display optical system includes a plurality of reflecting surfaces in said second optical member.

2. The image display apparatus according to claim 1, wherein the optical surface (A) having the two functions of transmission and reflection, shared between the illumination optical system and the display optical system, comprises only one surface.

3. The image display apparatus according to claim 1, wherein the plurality of reflective surfaces in the display optical system are decentered curvature surfaces.

4. The image display apparatus according to claim 3, wherein the display optical system includes two or more surfaces with refracting powers differing depending upon azimuth angles, and the entire display optical system has a positive refracting power.

5. The image display apparatus according to claim 1, wherein the display optical system is comprised of an optical member comprising the optical surface (A) and another optical member having an optical refracting power, said optical members being placed with an air space in between.

6. The image display apparatus according to claim 1, wherein the illumination light source means is an RGB time division light source and the display means displays images of R, G, and B in time division in synchronism with emission of color light beams of R, G, and B from the RGB time division light source.

7. A head mounted display comprising the image display apparatus as set forth in claim 6.

8. An image display apparatus comprising:

reflective display means;

illumination means for illuminating the display means;

an illumination optical system for guiding light from the illumination means to the display means;

a display optical system for guiding light from the display means to an observation position;

a first optical member used in common by said illumination optical system and a display optical system and having a first optical surface (A) functioning as a reflecting surface in association with said illumination optical system and as a transmission surface in association with said display optical system; and a second optical member;

wherein from said illumination means is reflected by said first optical surface (A) and is guided to said display means;

wherein light from said display means is transmitted through said optical surface (A) and then is transmitted through said second optical member to be guided to the observation position, wherein said first optical member has a second optical surface (B) opposed to said first optical surface (A) facing toward said display means so that light from said display means is transmitted through said first optical surface (A) and thereafter is transmitted through said second optical surface (B), said first optical surface (A) has a curvature and said second optical surface (B) is a curved surface, wherein, when a reference ray is defined as a ray which is illumination light from said illumination means that is reflected at the center of said display means and emerges therefrom and is incident on the center of a pupil, and a plane that includes incident light and exit light of the reference ray in each surface is defined as a local meridional section in each surface, the following condition is satisfied, $$0.4 < local.ryA/local.ryB < 2.0,$$

where local.ryA and local.ryB are radius of curvature of said first optical surface (A) and a radius of curvature of said second optical surface (B) in the local meridional section, respectively, and have the same sign, and wherein said display optical system includes a plurality of reflecting surfaces in said second optical member.

9. The image display apparatus according to claim 8, wherein the first optical surface (A) having the two functions of transmission and reflection, shared between the illumination optical system and the display optical system, comprises only one surface.

10. The image display apparatus according to claim 8, wherein the reflected light from the display means emerge from the lens body and thereafter is reflected by a plurality of reflective surfaces being decentered curvature surfaces to be guided to the pupil.

11. The image display apparatus according to claim 8, wherein said illumination means is a time division light source for emitting a plurality of color light beams in time division and the display means displays images based on respective color beams in time division in synchronism with emission of the color light beams from the time division light source.

12. A head mounted display comprising the image display apparatus as set forth in claim 11.

13. The image display apparatus according to claim 8, wherein the display optical system includes two or more surfaces with refracting powers differing depending upon azimuth angles, and the entire display optical system has a positive refracting power.

14. A head mounted display comprising the image display apparatus as set forth in claim 13.

15. The image display apparatus according to claim 8, wherein said lens body is comprised of a glass member.

16. The image display apparatus according to claim 8, wherein said first optical surface (A) and said curved second optical surface (B) are cylindrical surfaces.

17. The image display apparatus according to claim 8, wherein said first optical surface (A) is a half mirror of metal.

18. An image display apparatus comprising:

reflective display means;

illumination means for illuminating the display means;

an illumination optical system for guiding light from the illumination means to the display means;

a display optical system for guiding light from the display means to an observation position a first optical member used in common by said illumination optical system and said display optical system and having a first optical surface (A) functioning as a reflecting surface in association with said illumination optical system and as a transmission surface in association with said display optical system; and a second optical member;

wherein illumination light from said illumination means is reflected by said first optical surface (A) and is guided to said display means;

wherein light from said display means is transmitted through said optical surface (A) and then is transmitted through said second optical member to be guided to the observation position, wherein said first optical member has a second optical surface (B) opposed to said optical surface (A) facing toward said display means so that light from said display means is transmitted through said first optical surface (A) and thereafter is transmitted through said second optical surface (B), said first optical surface (A) has a curvature and said second optical surface (B) is a curved surface, wherein, when a reference ray is defined as a ray that is illumination light from said illumination means that is reflected at the center of said display means and emerges therefrom and is incident on the center of a pupil, and a plane that includes incident light and exit light of the reference ray in each surface is defined as a local meridional section in each surface, in the local meridional section of a display means surface, the optical path length of a ray, in said first optical member, that passes a most peripheral image on said display means at a far side from the observation position and a center of the pupil is longer than the optical path length of a ray, in said first optical member, that passes a most peripheral image on said display means at a near side from the observation position and the center of the pupil, and, wherein said display optical system includes a plurality of reflecting surfaces in said second optical member.

19. The image display apparatus according to claim 18, wherein a curvature in the local meridional section of said first optical curvature surface (A) of said lens body in said display optical system is larger than a curvature in the local meridional section of said second optical curved surface (B).

20. The image display apparatus according to claim 19, wherein optical path lengths in the lens body in the display optical system of eye center rays at respective image heights, passing the image heights and the center of the eye, on the local meridional section of said display means, become gradually longer from said F2 eye center ray side to said F3 eye center ray side.

* * * * *